US012039568B2

(12) United States Patent
Manfield et al.

(10) Patent No.: US 12,039,568 B2
(45) Date of Patent: Jul. 16, 2024

(54) SYSTEM AND METHOD FOR DISSEMINATING INFORMATION TO CONSUMERS

(71) Applicant: EMELEM PTY LTD., South Australia (AU)

(72) Inventors: Matthew Manfield, South Australia (AU); Maria Manfield, South Australia (AU)

(73) Assignee: EMELEM PTY LTD, Seaford Rise (AU)

( * ) Notice: Subject to any disclaimer, the term of this patent is extended or adjusted under 35 U.S.C. 154(b) by 20 days.

(21) Appl. No.: 17/425,645

(22) PCT Filed: Jan. 24, 2020

(86) PCT No.: PCT/AU2020/050051
§ 371 (c)(1),
(2) Date: Jul. 23, 2021

(87) PCT Pub. No.: WO2020/150790
PCT Pub. Date: Jul. 30, 2020

(65) Prior Publication Data
US 2022/0101378 A1    Mar. 31, 2022

(30) Foreign Application Priority Data

Jan. 24, 2019    (AU) .............................. 2019900225

(51) Int. Cl.
*G06Q 30/00*    (2023.01)
*G06Q 30/0251*    (2023.01)

(52) U.S. Cl.
CPC ..... *G06Q 30/0258* (2013.01); *G06Q 30/0255* (2013.01); *G06Q 30/0259* (2013.01);
(Continued)

(58) Field of Classification Search
None
See application file for complete search history.

(56) References Cited

U.S. PATENT DOCUMENTS

2011/0238474 A1*    9/2011    Carr ...................... G06Q 20/34
                                                    705/14.69
2013/0191213 A1    7/2013    Beck et al.
(Continued)

FOREIGN PATENT DOCUMENTS

WO    2011/119407 A1    9/2011
WO    2017/079280 A1    5/2017

OTHER PUBLICATIONS

Jun. 1, 2021 International Preliminary Report on Patentability issued in International Patent Application No. PCT/AU2020/050051.
(Continued)

*Primary Examiner* — Matthew T Sittner
(74) *Attorney, Agent, or Firm* — Williams Mullen; R. Brian Drozd

(57) ABSTRACT

A computer implemented system including a primary user device operable to access and execute computer instruction code that, when executed, causes generation and sending of notifications to one or more secondary user devices, a database of previously collected data in respect of users of the secondary user devices where the one or more secondary user devices operated by users other than users of primary user devices, and a matching engine, wherein generated notifications are matched, by the matching engine, to the user of a secondary user device according to analysis of the previously collected data regarding the user of the secondary user device such that notifications sent to the secondary user device are relevant to the user of the secondary user device.

27 Claims, 19 Drawing Sheets

(52) U.S. Cl.
CPC ..... *G06Q 30/0261* (2013.01); *G06Q 30/0264* (2013.01); *G06Q 30/0271* (2013.01)

(56) References Cited

U.S. PATENT DOCUMENTS

| | | | |
|---|---|---|---|
| 2013/0275220 A1 | 10/2013 | Bonk et al. | |
| 2014/0152453 A1* | 6/2014 | Dahl | G08B 25/10 340/686.6 |
| 2015/0031388 A1* | 1/2015 | Chatterjee | G06Q 20/322 455/456.1 |
| 2016/0048892 A1* | 2/2016 | Luk | G06Q 30/0601 705/26.1 |
| 2016/0070580 A1* | 3/2016 | Johnson | G06Q 30/0283 715/708 |
| 2016/0099590 A1* | 4/2016 | Velderman | G07F 7/06 320/113 |
| 2018/0253752 A1 | 9/2018 | Lam et al. | |
| 2018/0260567 A1* | 9/2018 | Ullom | G06F 21/35 |
| 2018/0365754 A1* | 12/2018 | Wall | G06Q 10/08 |
| 2019/0391858 A1* | 12/2019 | Studnicka | G06Q 20/227 |
| 2020/0034901 A1* | 1/2020 | Bruno | G06Q 30/0226 |

OTHER PUBLICATIONS

Mar. 16, 2020 International Search Report issued in International Patent Application No. PCT/AU2020/050051.
Mar. 16, 2020 Written Opinion issued in International Patent Application No. PCT/AU2020/050051.
May 1, 11, 2022 Extended European Search Report issued in European Patent Application No. 20 744 906.7.

* cited by examiner

SYSTEM AND METHOD FOR DISSEMINATING INFORMATION TO CONSUMERS

FIELD OF THE INVENTION

The present invention relates to a system and method for disseminating information that is selected for its relevance to consumers. In particular, the present invention relates to a system and method for disseminating relevant retail information to consumers, including, but not limited to, products and services offered for sale, retail offers and/or promotional material.

BACKGROUND OF THE INVENTION

The ability of a retail business owner (vendor) to advertise goods and/or services offered for sale to consumers in an effective manner is critical to the success of the vendor's business. Traditionally, advertisement of goods and/or services for sale is achieved using one or more advertising mediums/platforms including, but not limited to, billboards, magazines, pamphlets, brochures and television/radio advertisements.

However, the dramatic increase in popularity of "online shopping" in recent times has resulted in many "physical" retail businesses (as compared with retail business located in a virtual "online" environment) experiencing a substantial decline in sales. This is primarily due to the convenience and flexibility associated with online shopping and the ability of a consumer to target (focus) their search query online for any desired goods and/or services they seek to purchase.

In addition, increasing costs associated with traditional forms of advertising has resulted in most physical retail businesses either reducing their level of advertising (thereby leading to a decrease in advertising sales), or alternatively, moving from a physical retail business to a virtual (or online) retail business.

Furthermore, traditional forms of advertising are considered to be a "passive" form of advertising since they rely on the consumer paying attention to, for example, advertising material on billboards or reading brochures, pamphlets and advertising material that has been provided to the consumer in the post. This problem is somewhat mitigated with online advertising since a consumer is provided with advertising material whilst online with convenient hyper-links to websites to accommodate a sale and accordingly, there is a greater chance that the consumer will be motivated to consider such material and purchase goods and/or services that are advertised on-line.

However, much online advertising material is either not relevant to the consumer, or is provided to the consumer during times in which it is not convenient to consider making a purchase, for example, when they are conducting a search query on the internet or when they are using social media.

With vastly increased competition for consumer attention and the sales that arise therefrom, retailers increasingly need to consider how to advertise to consumers at a time and place which is likely to be convenient to the consumer to consider purchasing goods and/or services.

Accordingly, there exists a need for a system and method that ameliorates, or at least provides an alternative to, conventional systems and methods for disseminating advertising or promotional information in a more effective manner, wherein such information is relevant to consumers according to their preferences and requirements and is provided to the consumer at a time and/or place that improves convenience for the consumer hence improving the prospects of a sale.

SUMMARY OF THE INVENTION

In one aspect, the present invention provides a computer implemented system including: a primary user device operable to access and execute computer instruction code that, when executed, causes generation and sending of notifications to one or more secondary user devices, a database of previously collected data in respect of users of the secondary user devices where the one or more secondary user devices operated by users other than users of primary user devices; and a matching engine; wherein generated notifications are matched, by the matching engine, to the user of a secondary user device according to analysis of the previously collected data regarding the user of the secondary user device such that notifications sent to the secondary user device are relevant to the user of the secondary user device, and further wherein, the primary user device is operable to execute computer instruction code to send notifications to the one or more secondary user devices, when the one or more secondary user devices are located within a specified region in relation to a geographical location specified by the one or more secondary user devices, and at a particular time, or within a particular period of time, specified by the one ore more secondary user devices.

It will be understood that within the context of the present invention, a "notification" includes, but is not limited to, an electronic notification, a text message, an email message, a sound and/or an image. In embodiments, the notification may include directions in the form of an image (for example, a map).

In an embodiment, the primary user device is operable to access and execute computer instruction code to send notifications when the one or more secondary user devices are located within a specified region in relation to the geographical location. The specified region in relation to the geographical location may be specified by either the user of the primary user device and/or the user of the secondary user device by entering either Global Positioning System (GPS) coordinates or specifying a distance from a geographical location.

In an embodiment, the primary user device is operable to execute computer instruction code to send notifications to the one or more secondary user devices at a specified time, or within a specified period of time, of the day specified by the primary user device.

In an embodiment, the one or more secondary user devices are operable to execute computer instruction code to receive notifications at a specified time, or within a specified period of time, of the day specified by the secondary user device.

A user of a secondary user device may nominate/indicate one or more retail establishments as "preferred" retail outlet(s) (for example, by adding the names of any preferred retail outlets to a "favourites" list within the system application). The user of the secondary user device may also receive notifications in relation to any preferred retail outlet whether the user is within, or outside, the specified region in relation to the geographical location associated with one or more preferred retail establishments.

Accordingly, in an embodiment, a user of a secondary device is able to nominate one or more retail establishments associated with a geographical location as a preferred retail establishment, so that the primary user device associated with the geographical location of a preferred retail establishment is operable to send notifications when the one or more secondary user devices are located within, or outside, a specified region in relation to the geographical location.

In embodiments, users of the primary user devices may be vendors (owners, managers or employees) of retail establishments, whilst users of the secondary user devices may be customers of such retail establishments.

In embodiments, the notifications relate to retail information, including but not limited to, promotional offers, sales and the like. In embodiments, notifications may also include location details of the offer and may further include directions or a graphic representation (such as a map) providing directions from a user's (customer's) location to the location of the retail establishment.

In an embodiment, notifications to one or more secondary devices are able to be sent to, and/or received, by, one or more secondary devices when users of the secondary user devices are located within a specified region (as specified either the user of a primary device or secondary device) in relation to a geographical location associated with a primary user device.

For example, a user of a primary user device (e.g., an owner of a retail establishment), may elect to specify a distance of 10 km thereby defining a 10 km region that surrounds the geographical location of interest (for example, their retail establishment). Accordingly, any secondary user device that has subscribed to the application associated with the system and method of the present invention and that is located within 10 km of the geographical location of the retail establishment, may form a communication link with the primary user device and operably receive notifications and/or send messages from/to the primary user device associated with that geographical location.

Alternatively, a user of a secondary user device may prefer to be notified of any sales or promotional material associated with a retail establishment, only if they are within a specified region according to the secondary user's choice (for example, within a 5 km region of the retail establishment). The user of the secondary device may therefore specify a surrounding region of 5 km, by operation of the secondary user device, and hence, enable their device to form a communication link with the primary user device associated with a geographical location only when they are within 5 km of the retail establishment.

The relevance of notifications may be determined, in some embodiments, by monitoring purchases made by the user of the secondary user device. For example, if the user of a secondary user device frequently patronises a particular retail establishment and/or purchases goods and/or services from the particular retail establishment, embodiments of the system and method of the present invention may monitor such activities so that any notifications relating goods and/or services offered for sale by a particular retail establishment are selectively forwarded to the user of a secondary user device.

Accordingly, embodiments of the system and method of the present invention enable users of secondary user devices to receive notifications of increased relevance as compared with conventional methods of marketing and advertising. Moreover, the more a user of a secondary user device uses the system application of the present invention, or the greater the subscription period of the secondary user device with the system, the more the system will learn about the user's purchasing activities, search activities and preferences, thereby increasing the relevance of notifications forwarded to the user.

Alternatively, the relevance of the messages may be determined by monitoring and collecting information in relation to search queries made by a user of secondary user device in an online environment. For example, if a user of a secondary user device submits search queries in relation to a particular product, for example, a particular brand of cosmetic, then any notifications including promotional, retail or sale material relating to that particular brand of cosmetic may be selectively sent to the user of the secondary user device, when the user is within a specified region in relation to a geographical location associated with the physical retail establishment in which that particular brand of cosmetic is offered for sale.

In some embodiments, the relevance of notifications may be determined by monitoring and collecting information in relation to prior purchases made by the user of the secondary user device at one or more geographical locations associated with the primary user device (i.e., physical retail establishments).

The relevance of a notification to a user of a secondary user device may also be determined by monitoring (tracking) the movements of the user. For example, a user (consumer) may frequent a local department store, and the consumer's movements at and within the store may be monitored by the use of GPS coordinates to determine potential items of interest to the consumer. If, for example, the consumer spends a significant amount of time in the menswear department within the local department store, the system is operable to monitor, collect and store this information. This information may then be used by the system to send one or more notifications from a primary user device offering promotions, offers and purchasing incentives in relation to menswear from the local department store to the consumer.

In embodiments, the system may also predict likely future purchases of a consumer based on their previous purchases, their online searching/shopping history or their movements at, and within, retail establishments. As a result, the system may automatically select, based on relevance, which notifications (offers, promotions or advertisements) to send to one or more users (consumers) thereby increasing the user's engagement with the system and hence likelihood of achieving a sale.

In embodiments, the system may also estimate characteristics of a user of a secondary device, including their age, gender and economic status, based on information collected with respect to the user's prior purchases, online/shopping purchasing history and their choice of retail establishments at which they purchase goods and/or services. For example, the system may estimate that a user of a secondary device that frequents certain retail establishments is likely to be a middle-aged male on a reasonably low income. The system may then automatically select which notifications (offers, promotions or advertisements) to send to such a user, based upon relevance, and thereby increase the level of user engagement and the likelihood of achieving a sale.

In embodiments, one or more of natural language processing, text analysis, and/or machine learning techniques may be used to determine the relevance of a notification to one or more secondary users. Additionally, or alternatively, the system may include an inference engine to better understand the users submitted online search queries to predict future purchasing of goods and/or services of a particular user.

In other embodiments, in addition to receiving notifications from the primary user device, a user of a secondary user device may also send messages to a primary user device.

Accordingly, in one embodiment of the present invention, a user of a secondary user device is able to reserve one or more items or products, or schedule one or more services offered for sale, by a physical retail establishment, by use of the secondary user device.

For example, if a user of a secondary user device is within a specified region of a physical retail establishment and receives a notification from a primary user device associated with that retail establishment relating to a product that is offered for sale at, for example, a reduced price, the user of the secondary user device may send a message to the primary user device requesting reservation of that item or product for purchase. In this regard, it will be appreciated that since the user of the secondary user device will receive notifications and send messages whilst they are within a specified distance of the geographical location, it would likely be convenient for the user of the secondary user device to attend the premises of the retail establishment in order to collect any reserved items.

In some embodiments, the user of the secondary user device may also make a purchase using the secondary user device. In this embodiment, since the one or more secondary user devices may only form a communication link with a primary user device associated with a geographical location (i.e., the physical premises of a retail establishment) when the secondary user device is located within a specified region of the geographical location of the retail establishment (for example, a 3 km radius), then it would likely be convenient for the user of the secondary user device to collect any purchased items from the retail establishment.

Since receiving notifications and/or sending messages and conducting payment transactions with the use of a secondary user device may only be possible when the secondary user device is within a specified region of the geographical location associated with the primary user device, it will be appreciated that a user of a secondary user device may not receive any notifications from a primary user device when the secondary user device is outside the specified regions in relation to the geographical location associated with the primary user device. This should avoid a user of a secondary user device receiving notifications at times, and under circumstances, in which the user of the secondary user device would consider it inconvenient to make a purchase and therefore prefer not to receive notifications. This should also assist in retaining the interest of users of secondary user devices (i.e., consumers), since they would not be subjected to irrelevant advertising during times and under circumstances in which they are either not interested, or it is inconvenient, to make a purchase.

In an embodiment, the one or more users of the secondary user devices may effect a payment transaction by the use of their secondary user device. Accordingly, a user of a secondary user device may make a purchase remotely from, for example, a retail establishment (or storage warehouse in which items for sale are stored) and subsequently collect their items from the retail establishment or storage warehouse. Alternatively, a user may use their secondary user device to make a purchase when they are located at the retail establishment.

In some embodiments, the primary user device may be configured to receive a notification (or an indication) of each instance a secondary user device is located within a specified region of the geographical location associated with the primary user device. Once notified, the user of the primary user device (for example a manager or an owner of a retail establishment) may send one or more notifications to one or more users of secondary devices including promotional and/or sales material.

In some embodiments, a user of a secondary user device may send to a primary user device associated with a geographical location, a review, feedback or a rating in respect of a retail establishment located at the geographical location.

In various embodiments, the primary user device automatically sends notifications to the one or more secondary user devices upon receiving a notification when the one or more secondary user devices are located within the specified region of the geographical location associated with the primary user device.

In another aspect, the present invention provides a computer implemented method including sending, by a primary user device operable to access and execute computer instruction code, notifications to one or more secondary user devices subsequent to accessing a database of previously collected data in respect of users of the secondary user devices, wherein the notifications sent to the secondary user devices are matched, by a matching engine, to the user of the secondary user device according to analysis of the previously collected data regarding the user of the secondary user device such that the notifications sent to the secondary user device are relevant to the user of the secondary user device, and further wherein, the primary user device is operable to execute computer instruction code to send notifications to the one or more secondary user devices, when the one or more secondary user devices are located within a specified region in relation to a geographical location specified by the one or more secondary user devices, and at a particular time, or within a particular period of time, specified by the one ore more secondary user devices.

In yet another aspect, the present invention provides a computer readable medium including instructions stored therein executable by one or more processors to perform the steps of: sending, by a primary user device associated with the one or more processors, notifications to one or more secondary user devices subsequent to accessing a database of previously collected data in respect of users of the secondary user devices; wherein the notifications sent to the secondary user device are matched, by a matching engine, to the user of the secondary user device according to analysis of the previously collected data regarding the user of the secondary user device such that the notifications sent to the secondary user device are relevant to the user of the secondary user device, and further wherein, the primary user device is operable to execute computer instruction code to send notifications to the one or more secondary user devices, when the one or more secondary user devices are located within a specified region in relation to a geographical location specified by the one or more secondary user devices, and at a particular time, or within a particular period of time, specified by the one ore more secondary user devices.

BRIEF DESCRIPTION OF THE DRAWINGS

Embodiments of the invention will now be described in further detail with reference to the accompanying figures in which.

DETAILED DESCRIPTION OF EMBODIMENT(S) OF THE INVENTION

For convenience, the invention will be described with respect to one or more embodiments, however it will be appreciated by those skilled in the art that the invention is not limited to these one or more embodiments.

Figure 1:
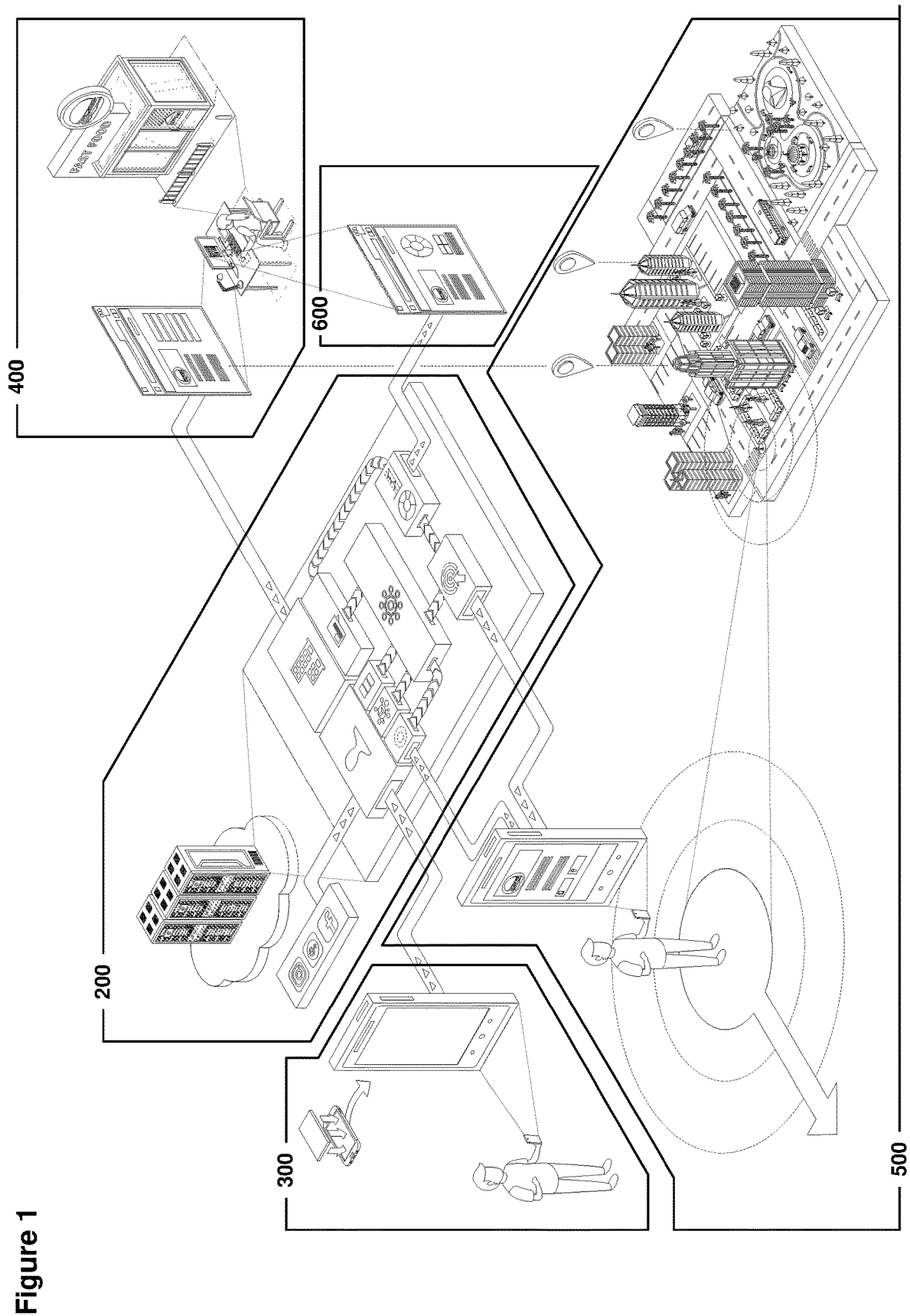
FIG. 1 provides a diagrammatic representation of an overview of a system according to an embodiment of the present invention.

With reference to FIG. 1, an overview of the system is provided according to an embodiment of the present invention. In particular, FIG. 1 depicts an embodiment of the system divided into notional sub-systems (200, 300, 400, 500 and 600) and how various devices, users and components within these notional sub-systems interact with one another to enable information generated by vendors to be selectively disseminated to the secondary user devices of customers through a primary (vendor) user device. It will be appreciated that such information may include, but is not limited to, promotional offers, purchasing incentives, information regarding opening hours of the retail establishment, information regarding products and services offered for sale and the like.

Central Server sub-system (200) details a central server that operates application code (executable instructions) and maintains storage (databases) associated with the system and method of the present invention. The application code and storage may be operated and maintained locally or may be a distributed application executed on multiple computers within a network.

Registration sub-system (300) details a customer user device, for example a tablet or a mobile device such as a smartphone or smartwatch, through which a customer registers and installs the system application.

Vendor sub-system (400) details a retail establishment associated with a vendor and a vendor user device through which a vendor may generate one or more notifications including retail information as described above. Vendor user device may include, but is not limited to, a personal computer, laptop, tablet or mobile device such as a smartphone.

Customer sub-system (500) details a customer accessing the system application and configuring their user device to receive notifications from one or more vendors in relation to retail sales and/or promotions offered by one or more retail establishments when the customer is physically located within a specified region from the one or more retail establishments.

The notifications including retail purchasing incentives and/or promotional offers are generated by the vendor (refer to sub-system 400) and forwarded, using vendor user device, to the customer user device. The notification will appear on the customer user device when the system detects the customer user device is physically located within a specified region from the retail establishment and forwarded to the customer.

The customer is also able to view any reviews posted by other users (customers) of the application in relation to particular retail establishments. Once a customer receives a notification from a vendor, the customer may provide feedback to the vendor or may make a purchase. Any feedback received by a vendor from a customer may be viewed by the vendor on a vendor user device as detailed in Feedback sub-system (600). Such feedback may include, but is not limited to, an enquiry/message/rating sent by a customer in relation to a particular promotional offer or purchasing incentive (for example). Details of any purchase made by the customer may also be provided as feedback to the vendor.

Each notional sub-system (200, 300, 400, 500 and 600) will now be described in further detail with reference to FIGS. 2, 3, 4, 5 and 6.

Figure 2:
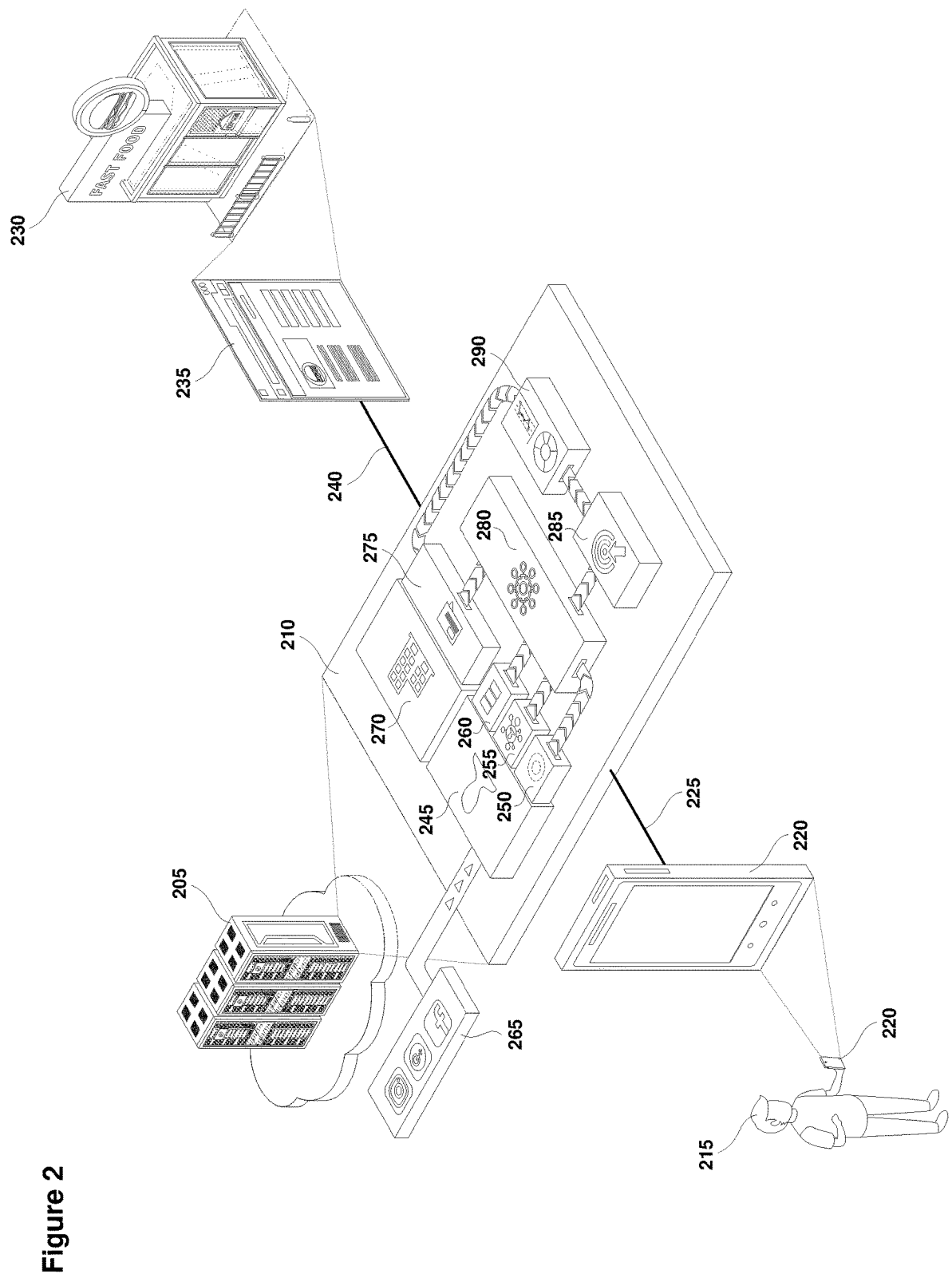
FIG. 2 provides a diagrammatic representation of components of a system according to an embodiment of the present invention.

Referring to FIG. 2, one or more central servers (205) operate the programming code associated with system application (210). The system application (210) operates through a data communication network (225) to enable a customer (215), or a vendor in a retail establishment (230), to interact with the system application (210) by the use of, respectively, a smartphone (220) or a laptop device (235). It will be appreciated the data communication network may be any type of data communication network, one example being the internet connected by Wi-Fi or a cellular data connection. In this embodiment, the communication network operates via a virtualized management system (i.e., "cloud" based infrastructure) accessible to users (vendors and customers) through the internet under a "pay per use" payment system.

One or more customer information databases (245) are also associated with system application (210) within which various information relating to one or more subscribed customers is collected, stored and maintained. Such customer information may include, but is not limited to:

customer account information (250) (including, but not limited to, customer name, customer contact details and customer location);

customer insight information (255) (including, but not limited to, previous purchase history, previous online search history, reviews posted by and/or commented on by the customer, previous notifications sent to the customer by various vendors, any retail outlets entered by the customer in their "favourites" list, any information relating to tracked movements of a customer and any feedback sent by a customer to one or more vendor(s) in relation to any received notifications);

customer preferences (260) (preferred method for receiving notifications and sending messages from/to vendors (e.g., email or short message service); preferred (specified) distance from retail establishment for enabling communication with vendor device(s) in order to receive notifications and/or provide feedback regarding retail offers; preferred frequency and timing of notifications; selection/nomination of the goods and/or services of interest; allowing/blocking access by the system application to one or more the customer's social media accounts; a list of "approved" vendor/retail establishments from which the customer prefers to receive notifications; a list of "blocked" vendor/retail establishments from which a customer does not want to receive notifications; and social media information (265) (including information sought by the system through interrogation of one or more social media accounts related to a particular customer such as, but not limited to, Facebook, Instagram and Snapchat).

By storing and maintaining any previously collected customer information (data) in one or more customer information databases (245) associated with the system application (210), one or more notifications are able to be selectively sent to customers based on relevance of the notification to a particular customer. That is, any notifications generated by a vendor and sent to a particular customer will be in accordance with the customer account information (250), customer insight information (255), customer preferences (260) and social media information (265), collected, stored and maintained in one or more customer information databases (245) associated with system application (210), and should therefore be of relevance to a particular customer's preferences and interests. It will be appreciated that by sending notifications (including retail information, promotional offers and purchase incentives information) that are of relevance to a customer and that are in accordance with the customer's defined preferences and interests, should increase the customer's engagement and thereby increase the customer's response rate to any promotional offers and/or purchase incentives received. In turn, an increased response rate should result in an increased number of sales and revenue for the vendor.

In addition, by sending notifications in relation to one or more promotional offers or sales associated with a particular retail establishment to a customer only when the customer is within a specified distance from that retail establishment, avoids a customer being sent notifications at inconvenient times (for example, whilst they are at work or at home), thereby reducing the risk of causing annoyance to the customer. The receipt of notifications of a customer only when they (and their user device) are located within a specified distance from a retail establishment also assists in maintaining customer engagement thereby likely resulting in an increased response rate to any promotional and/or sales material sent to the customer. In turn, an increased response rate should result in an increased number of sales and revenue for the vendor.

System application (210) also maintains vendor information in one or more vendor information databases (270). Such vendor information may include, but is not limited to, the name(s) of the retail establishment(s) associated with a vendor, the registration (account) details of the vendor, the vendor's preferred method of communication with one or more customers (for example, vendor email address (for email communication) and/or mobile telephone number (for short message communication)) and any preferences set by the vendor (for example, specified distance from geographical location associated with the vendor's retail establishment within which communication with one or more customers is enabled and established).

Vendor information databases (270) also store additional information including GPS coordinates associated with vendor retail establishments, and store plans which include detail regarding the location and categorization of items offered for sale within a store. In this regard, the system is able to monitor (track) the movements of a consumer browsing within a retail establishment in order to determine the items that are of interest to the consumer and therefore determine the relevance of a notification to a user.

For example, a consumer's movements within a retail establishment are monitored (tracked by the use of GPS coordinates) and compared with a plan of the retail establishment stored in vendor information databases (270) associated with the system. By comparing the consumer's movements and the information located in the store plan, the system is able to determine that men's shoes, ties, and shirts are items of interest to the consumer. Accordingly, the system automatically identifies any notifications (offers, promotions or advertisements) relating to men's shoes, ties and shirts generated by the vendor and sends any relevant notification to the consumer.

The system may also predict likely future purchases of a consumer based on their previous purchases, their online searching/shopping history or their movements at, and within, retail establishments as described above. As a result, the system may be able to automatically select, based on relevance, which notifications (offers, promotions or advertisements) to send to one or more users (consumers) and thereby increase the user's engagement and likelihood of achieving a sale. Once again, the system may use any one or more natural language-based processing or text analysis/comparison techniques to determine the relevance between a consumer's online purchasing history and a notification (offer, purchasing incentive or advertisement) generated by a vendor.

In embodiments, the system may also estimate characteristics of a user of a secondary device, for example, their age, gender and economic status, based upon information collected with respect to the user's prior purchases, online/shopping purchasing history and their movements at, and within, retail establishments, as described above.

For example, the system determines a customer is conducting online searches in relation to luxury vehicles. The system also detects the customer has recently purchased items including women's toiletries and clothing, and, based on this information, the system estimates or infers, using inference logic, that the customer is a female with a reasonably high income. Based also on this information, the system determines notifications that are of potential relevance to the female customer with the reasonably high income and automatically selects notifications that may be of relevance to the customer.

To inform a customer of any promotional offers or purchasing incentives that may be of interest to the customer based upon the customer's preferences and interests, a vendor initially creates, by a system application interface accessed through their laptop user device (235), a notification containing a promotional offer and/or purchasing incentive and enters any details associated with the offer/purchasing incentive in a message database (275) associated with system application (210). The details associated with the offer/purchasing incentive may include, for example, the location of the offer/ purchasing incentive, the timeframe of the offer/purchasing incentive, the intended target market (customers) associated with the offer/purchasing incentive, any relevant keywords in relation to the offer/purchasing incentive and the specified distance from the location of the vendor's retail establishment within which notifications are to be sent to one or more customers in relation to the offer/purchasing incentive.

Once the notification (and its associated details) is created and stored in message database (275), system application (210) uses a matching engine (280) to compare the notification (and its associated details) with information stored the customer information database (245) and any additional databases to determine the relevance of the notification to a particular customer. In this regard, matching engine (280) uses one or more techniques including natural language processing, text analysis/comparison, machine learning and/or inference logic to match subscribed customers to one or more notifications generated by a vendor and stored in message database (275) based upon customer information stored in customer information database (245) and any additional information stored in the system (for example, GPS coordinates of retail establishments and store plans).

Once matching engine (280) has matched one or more notifications to one or more particular customers (215) based on relevance, the one or more notifications and the associated customer identification (contact) information matched to the one or more notifications is saved in a push offer database (285) and stored therein until such a time as the one or more user devices (220) associated with the one or more customers (215) are located within a specified distance from the geographical location of the retail establishment and are therefore able to form a communication link with system application (210) in order to receive one or more notifications from push offer database (285). Once the one or more customers (215) are within a specified distance to the retail establishment to enable a communication link to be formed between their customer user device (220) and the system application (210), central server (205) causes system application (210) to automatically send the one or more notifications stored in the push offer database (285) to the customer user device (220) associated with each of the one or more customers (215). It will be appreciated that since the notifications stored in the push offer database (285) have already been matched to one or more customers (215) based on relevance, customers (215) will only receive one or more relevant notifications on their user device (220) in accordance with their interests and preferences.

Push offer database (285) also receives any messages or feedback sent by one or more customers in response to one or more vendor notifications. Any messages sent, and any notifications received, by one or more customers are transmitted, via response processor (290), to message database (275) for action/response by the vendor. Response processor (290) also processes any feedback, messages, ratings received from one or more customers, or any purchases or reservations made by one or more customers, in relation to a particular vendor notification and generates associated analytical data. Such analytical data is then transmitted to message database (275) and made available for viewing by the vendor by the use of vendor user device (235).

Figure 3:
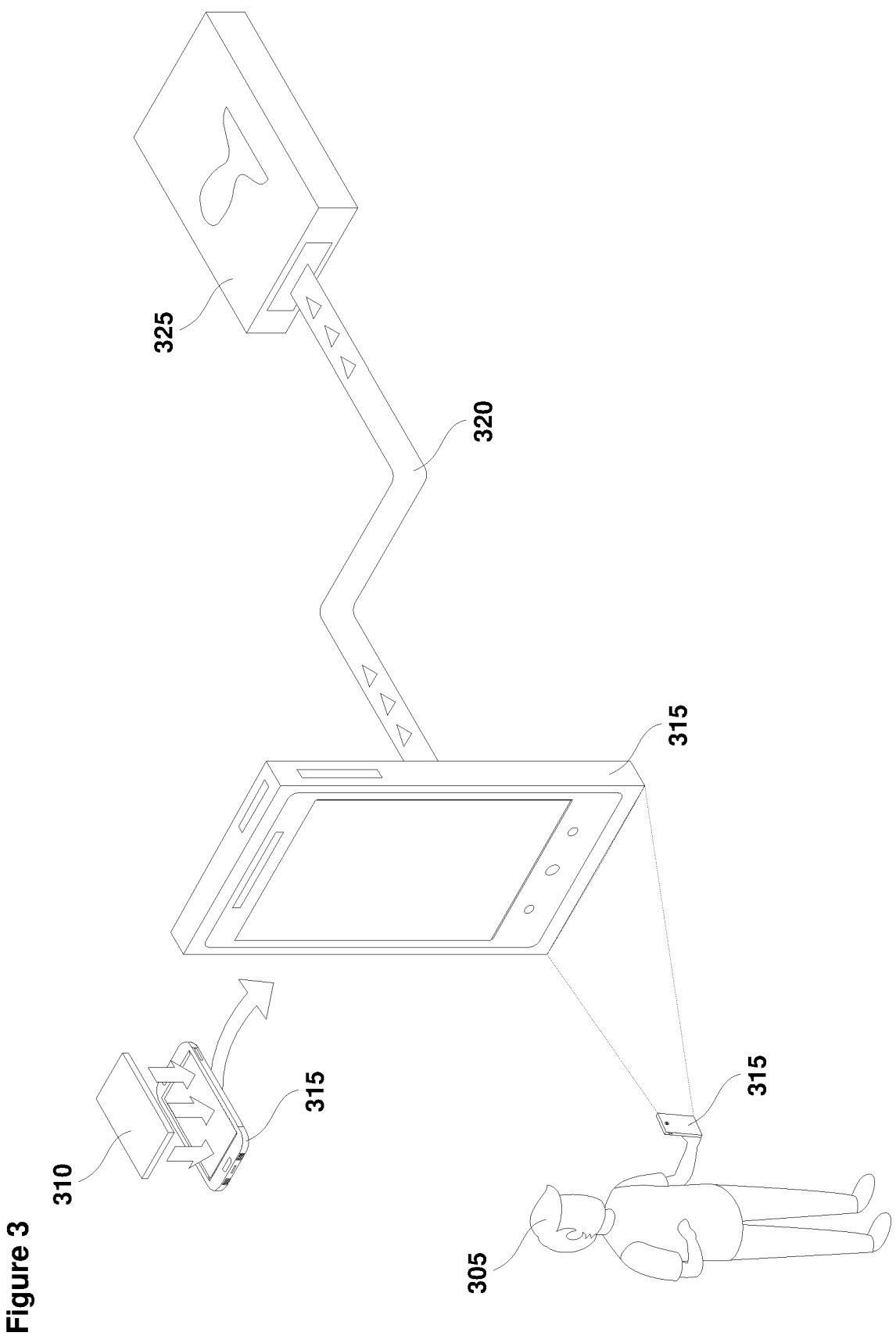
FIG. 3 depicts a user (customer) installing the application associated with the system and method of the present invention according to an embodiment.

FIG. 3 details the steps followed by a customer to download the application software associated with the system in accordance with an embodiment of the present invention. In this embodiment, customer (305) uses their mobile smartphone device (315) to download and install the application software from a digital distribution platform such an online application store (for example Apple "App Store" (for Apple products) or Google Play (for Android products)). Once the application software is installed on their mobile smartphone device (315), a communication link is formed using communication network (320) (Wi-Fi or a cellular data connection) between mobile smartphone device (315) and the system application, in order to create a user account stored and maintained in customer information database (325). Customer information database (325) will include information including, but not limited to, the customer's account information (registration details), the customer's preferences and any information associated with any social networking accounts of the customer. Customer information database will also continually collect, store, maintain and analyse information relating to the customer's activities including any online searching, social networking or other online activity performed by the customer, including online purchases and reservations and any feedback, messages or ratings sent by the customer in relation to a vendor notification.

Figure 4:
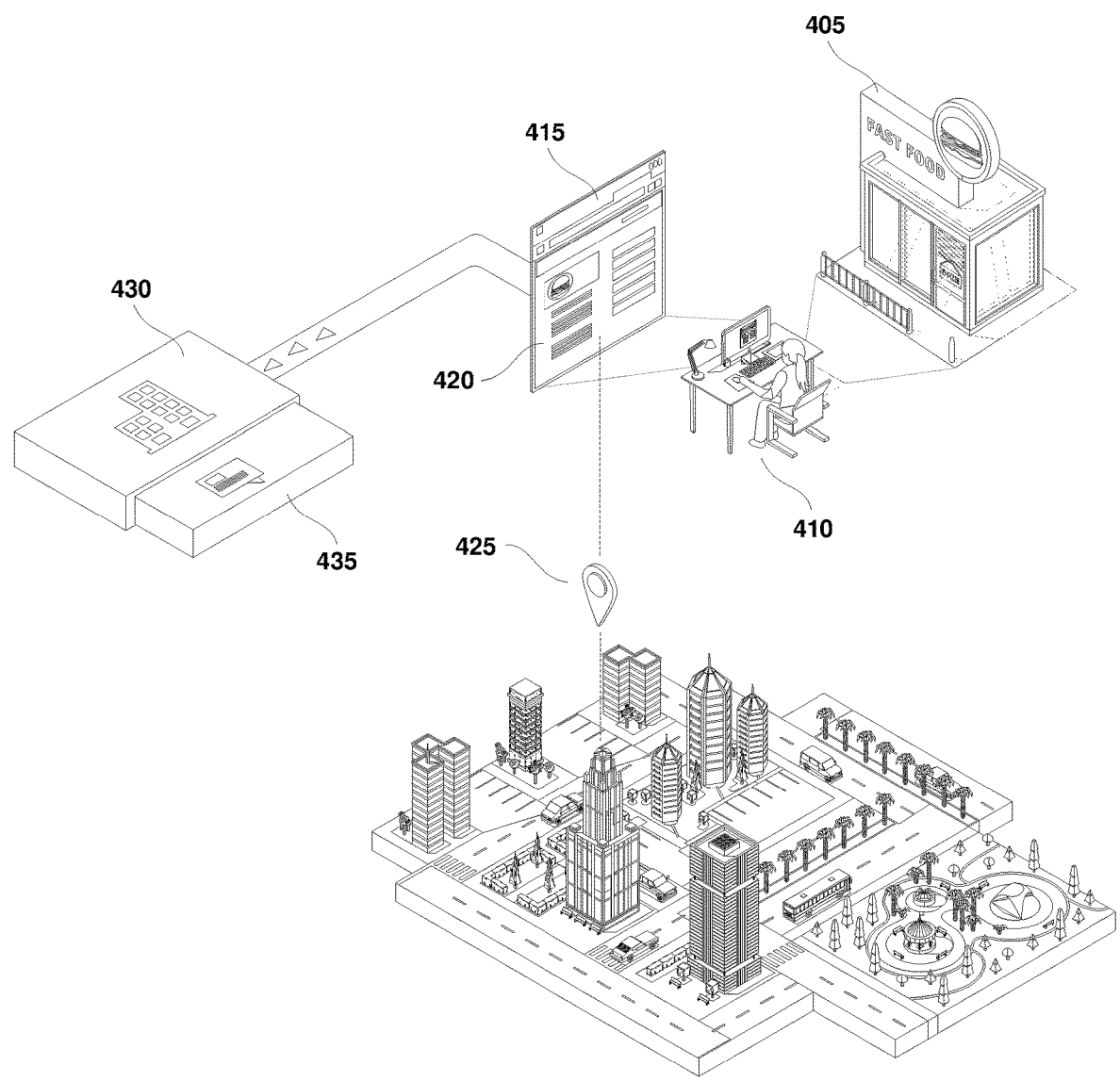
FIG. 4 depicts a user (vendor) creating messages that are to be forwarded to other users (customers) according to an embodiment of present invention.

FIG. 4 details the process undertaken by a vendor during the creation of a notification that includes information relating to a promotional/sales offer associated with their retail establishment. In this embodiment, the retail establishment is a fast food store named "Bob's Burgers" (405) located at venue (425). The individual creating the notification on behalf of the vendor is the manager (410) of Bob's Burgers (405). In order to create the notification, manager (410) accesses the system application (420) through the system application interface (415) located on their computer.

In order to promote a one-day sales offer to one or more customers, manager (410) creates the following notification which is stored within a message database (435) associated with a vendor account database (430) of the system application:

Message: "Free large fries and large drink with any burger purchase selected from the "Classic" burger range—offer only available today".

The manager will also enter the following information associated with the notification:

Venue location: 123 Princess Highway, Springfield North, 4321

Specified distance from venue: within 3 km of venue location

Offer time-period: 12 am-11.59 pm, Saturday 13 Oct. 2018

In order to increase the relevance of the message to one or more customers, the manager also enters/specifies the following optional information:

Intended customers: Customer's having purchased a product from specified venue within the last 12 months from date of notification The following four examples exemplify scenarios in which four different subscribed customers each having a registered user device and associated customer information entered against their individual user accounts enter within the distance specified by the vendor manager (i.e., within 3 km from the venue location (Bob's Burgers) on Saturday 13 Oct. 2018 (the date of the sales offer entered by the vendor manager):

EXAMPLE 1

Customer Receives Notification Upon Entering 3 km Specified Distance From Venue Location (As Specified by Vendor Manager)

Account Information:
 Customer name: Harry Smith
 Telephone number associated with registered user device: 0431 111 222
 Registered email address: harrysmith4321@gmail.com Customer Preferences:
  Approved venues: All
  Blocked venues: Flo's Fab Fries and Burgers
  Specified distance: within 5 km from any approved venue
  Preferred method of contact: sms to registered user device
Customer Insight Information:
  Product last purchased from Bob's Burgers on Sunday, 7 Oct. 2018
  Based upon Harry's customer information captured and outlined above, Harry would receive the notification generated by manager (410) since he has specified that he is willing to receive notifications from all approved venues when located within 5 km and he has purchased a product from Bob's Burgers with his registered device within the last 12 months from the date of the vendor message thereby meeting the "intended customers" criterion specified by the venue manager (410).

EXAMPLE 2

Customer Does Not Receive Notification Upon Entering 3 km Specified Distance From Venue Location (As Specified by Vendor Manager)

Account Information:
  Customer name: Mary Brown
  Telephone number associated with registered user device: 0431 333 444
  Registered email address: marybrown9876@hotmail.com
Customer Preferences:
  Approved venues: All
  Blocked venues: None
  Specified distance: within 4 km from any approved venue
  Preferred method of contact: sms to registered user device
Customer Insight Information:
  Product last purchased from Bob's Burgers on Sunday, 7 Oct. 2018
  According to the customer insight information for Mary Brown, Mary has not used her registered user device to purchase a product from Bob's Burgers within the last 12 months from the date of the notification. In accordance with information specified under "intended customers" by the venue manager (410), since Mary Brown has not purchased a product from Bob's Burgers within the last 12 months, she will not receive the notification generated by the vendor manager (410) on her registered user device despite meeting all other criteria.

EXAMPLE 3

Customer Does Not Receive Notification Upon Entering 3 km Specified Distance From Venue Location (As Specified by Venue Manager)

Account Information:
  Customer name: Mike Petersen
  Telephone number associated with registered user device: 0439 987 543
  Registered email address: mpetersen@yahoo.com
Customer Preferences:
  Approved venues: Flo's Fries and Burgers, Oasis Health Food Shop, Springfield North Hardware Supplies
  Blocked venues: Bob's Burgers
  Specified distance: within 5 km from any approved venue
  Preferred method of contact: sms to registered user device
Customer Insight Information:
  Product last purchased from Bob's Burgers on Monday, 8 Oct. 2018
  Whilst Mike has purchased a product from Bob's Burgers within the last 12 months and has entered within the 3 km specified distance from the venue, Mike will not receive the notification since he has specified Bob's Burgers as a "blocked" venue under his customer preferences thereby precluding the establishment of any communication between his registered user device and a vendor user device associated with Bob's Burgers.

EXAMPLE 4

Customer Does Not Receive Notification Upon Entering 3 km Specified Distance From Venue Location (As Specified by Venue Manager)

Account Information:
  Customer name: Gary North
  Telephone number associated with registered user device: 0420 123 563
  Registered email address: gnorth999@gmail.com
Customer Preferences:
  Approved venues: All
  Blocked venues: None
  Specified distance: within 1 km from any approved venue
  Preferred method of contact: sms to registered user device
Customer Insight Information:
  Product last purchased from Bob's Burgers on Friday, 7 Sep. 2018
  In this scenario, whilst Gary (and his registered user device) entered within 3 km from the location of Bob's Burgers thereby meeting the specified distance criteria set by the manager (410), since Gary (and his user device) were not located within 1 km of Bob's Burgers (i.e., the specified distance entered by Gary under his customer preferences), Gary will not receive the notification despite meeting all other criteria. According to the embodiment outlined in this scenario, the specified distance entered by a user (customer) under their customer preferences, takes precedence over the specified distance set by the vendor. In this regard, it will be understood that the phrase "specified distance" refers to a geographic region surrounding a specified location point (e.g., a retail establishment) within which a registered user device of a user (customer) must be located in order to form a communication link with the system application and thereby be enabled to receive notifications from a vendor user device associated with that retail establishment.

Figure 5:
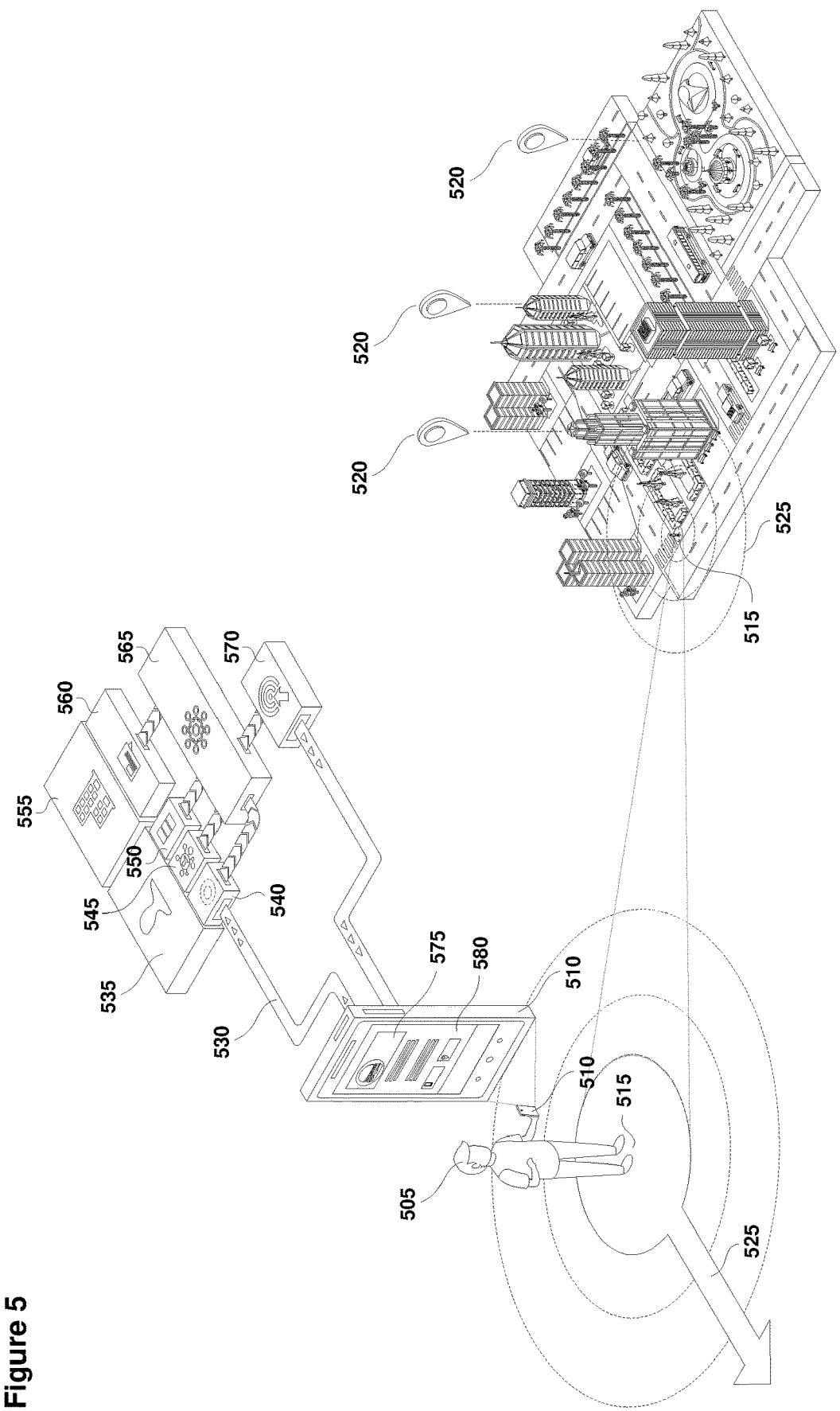
FIG. 5 depicts the way in which messages are selectively matched and forwarded to users (customers) according to an embodiment of the present invention.

The way in which the system application uses customer information stored in the system application to increase the relevance of the notifications received by one or more customers is detailed with reference to the embodiment of FIG. 5.

The system application is able to determine the location (515) (typically a geographic coordinate) of one or more customers (505) by monitoring the location of the customer's registered user device (510) which, according to this embodiment, is a mobile smartphone device. The location information (540) of a customer's user device is constantly monitored and updated (530) in one or more customer information databases (535) associated with system application (510).

Also stored and maintained within the one or more customer information databases (535) is customer insight information (545) and customer preference information (550). FIG. 5 also details one or more vendor information databases (555) within which vendor user account information associated with one or more registered and subscribed vendors is stored and maintained. Vendor information databases (555) also include one or more message databases (560) to store the notifications generated by vendors in relation to one or more sales or promotional offers offered at their retail establishment(s).

The system application (510) uses the customer location information (540), insight information (545) and preference information (550) in a matching engine (565) to match customers to notifications generated by a vendor, based on the customer's location, previous search, purchase and/or communication history (insight information) and the customer's preferences. Once a notification is matched to one or more particular customers, the matched notification is stored in push offer database (570).

When a customer (505) is within a specified distance (525) in relation to a geographical location (520) associated with a retail establishment with respect to which a notification (560) pertains, the customer user device (510) is enabled to form a communication link with the system application to thereby receive one or more relevant notifications (575) on their user device (510).

Once a notification is received, the customer (505) is able to use their user device (510) to respond to the notification by either deleting, ignoring, submitting an enquiry or making a purchase in response to the vendor notification by the use of interface (580) located on their user device (510). The response is collected and stored as customer insight information (545) and saved in the customer information database (535) associated with the system application. It will be appreciated that the response captured as user insight information may assist a vendor to assess the success of promotional offer associated with their vendor notification.

Figure 6:
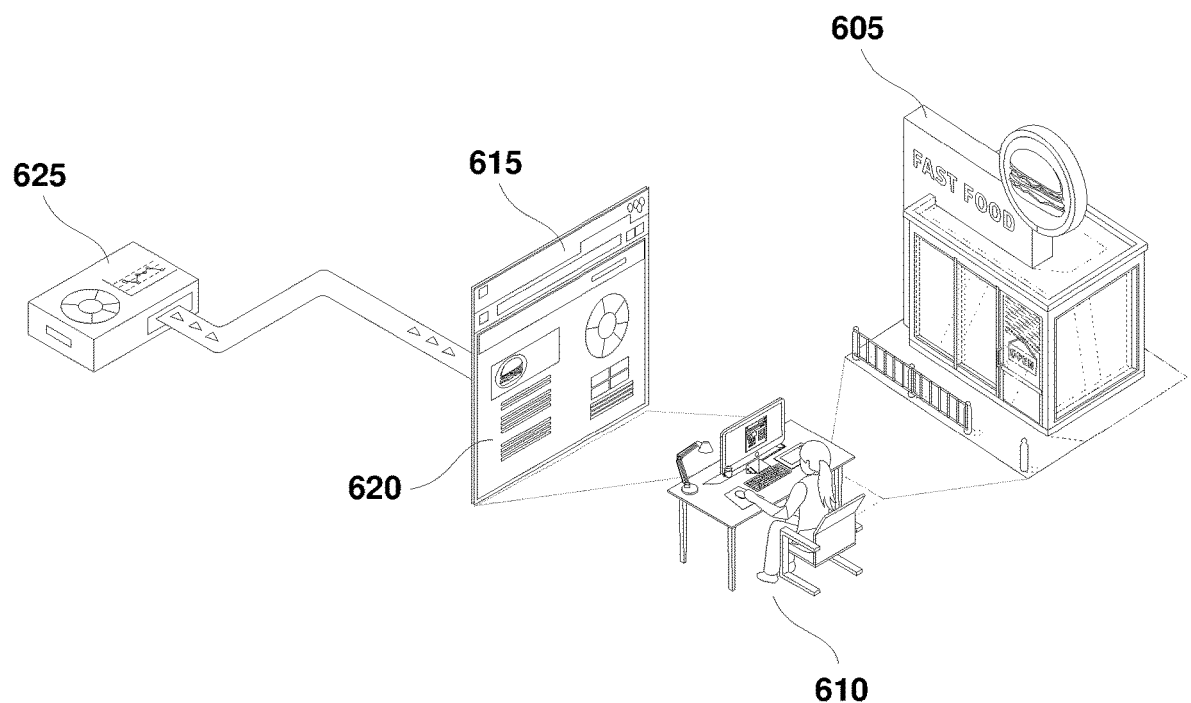
FIG. 6 depicts a user (vendor) reviewing customer feedback and associated data on an application interface in response to a message selectively forwarded to customers according to an embodiment of the present invention.

FIG. 6 details the process of a vendor (610) reviewing one or more responses in relation to one or more notifications sent to customers associated with a promotional offer in relation to a retail establishment (605). In this embodiment, vendor (610) uses a computer and system interface (615) associated with the system application (620) to view responses and various analytical data (625) associated with a notification sent to one or more customers. Accordingly, a vendor is able to use the system application (620) to assess the success (or otherwise) of a promotional offer based upon received user responses and associated analytical data.

Figure 7A:
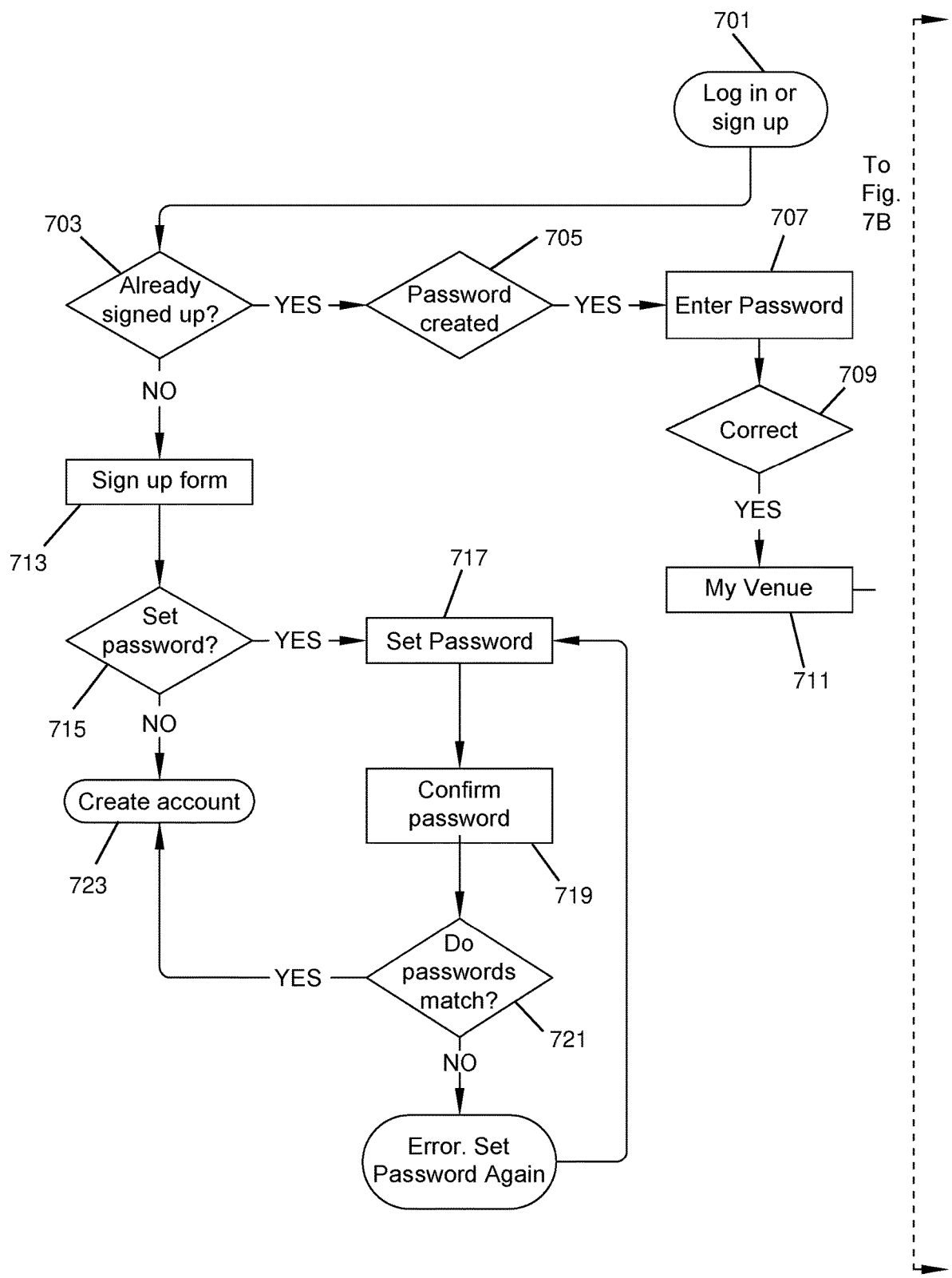
FIG. 7 provides an overview of how the system application, according to an embodiment of the invention, is navigated from a vendor's perspective.
Figure 7B:
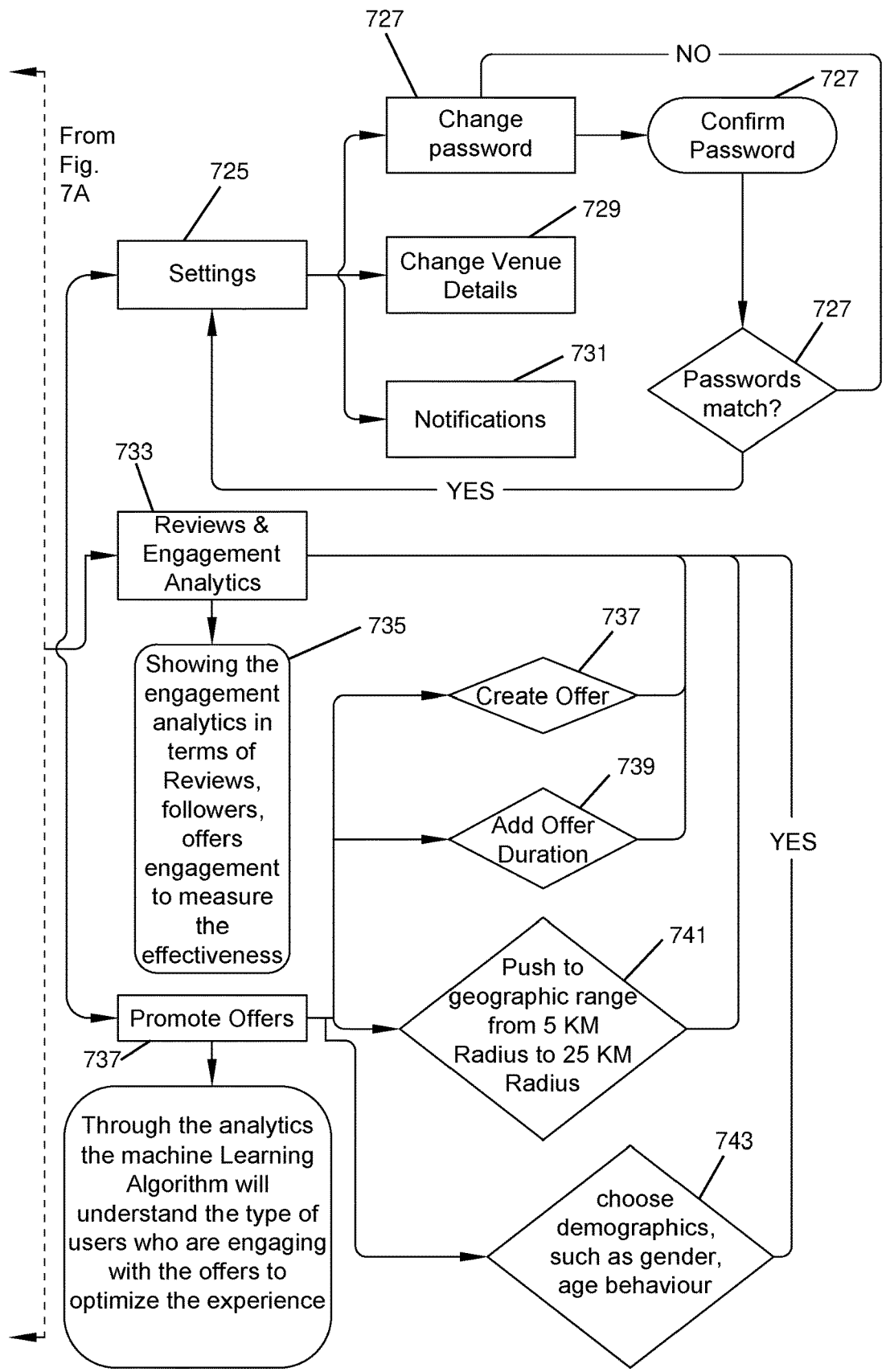

FIG. 7 provides an overview of the system application and the steps a user (vendor) takes in registering/login into the system application and navigating various features that are available to the vendor whilst accessing various user interfaces, examples of which are depicted in FIGS. 9a to 9l.

As shown in FIG. 7, to access the system application, a vendor has to either log-in (701) (if already registered) or sign-up (701) (if a first-time user). If the vendor is already registered (703) and has already created a password (705), the vendor enters their password (707) and if correct (709), the vendor is able to access the "My Venue" page (711) using the interface shown in FIG. 9b. Upon gaining access the system application, the vendor is able to view information regarding one or more of their "venues" (refer to FIG. 9d). In the event the vendor is a first-time user of the system application, the vendor is directed to a registration page (or "sign up" form) (713) wherein the vendor has to set a password (715) by entering a password (717) and confirming the password (719). If the entered and confirmed passwords match (721), the user is able to create an account (723). As part of the account creation process, the vendor is able to enter details including their full name, email address, password (with confirmation), their venue name and venue address (refer to FIG. 9c).

Figure 9A:
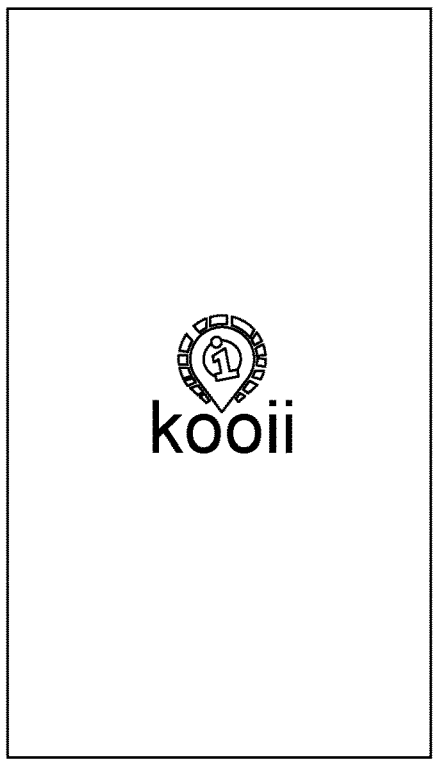
FIGS. 9a to 9l provide examples of the various user interfaces that enable a vendor to access and navigate the system application according to an embodiment of the invention.
Figure 9B:
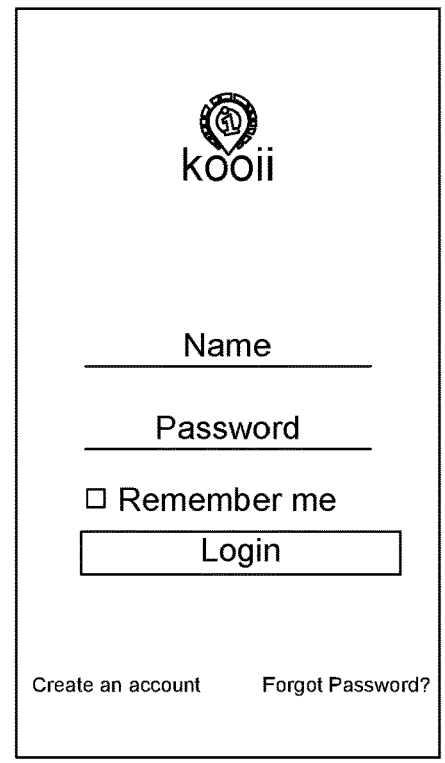
Figure 9C:
Figure 9D:
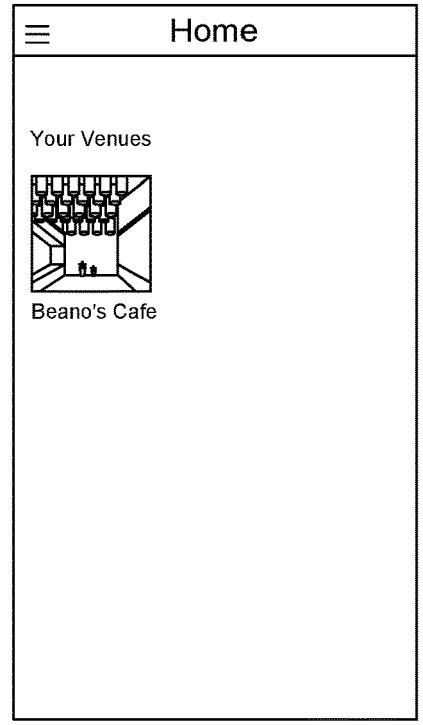
Figure 9E:
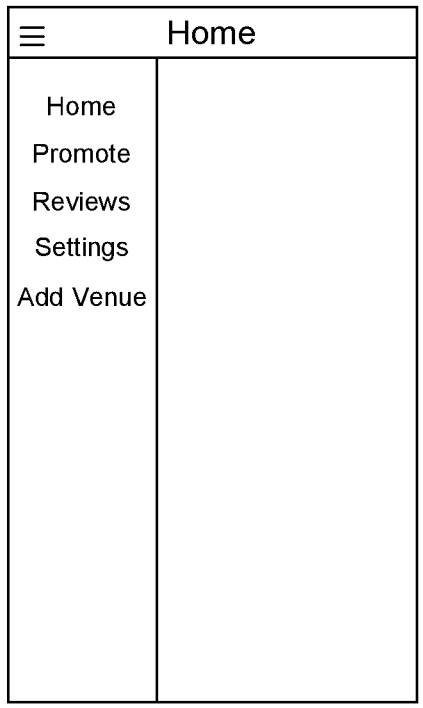
Figure 9F:
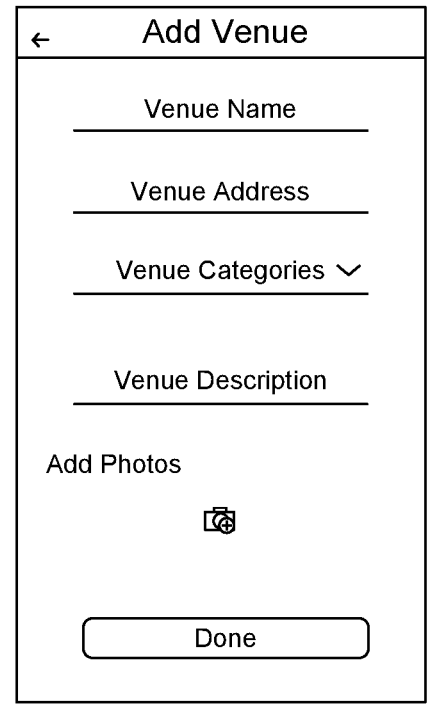
Figure 9G:
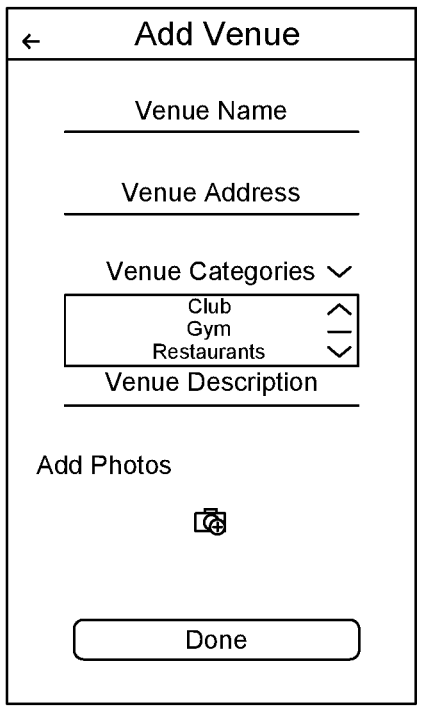
Figure 9H:
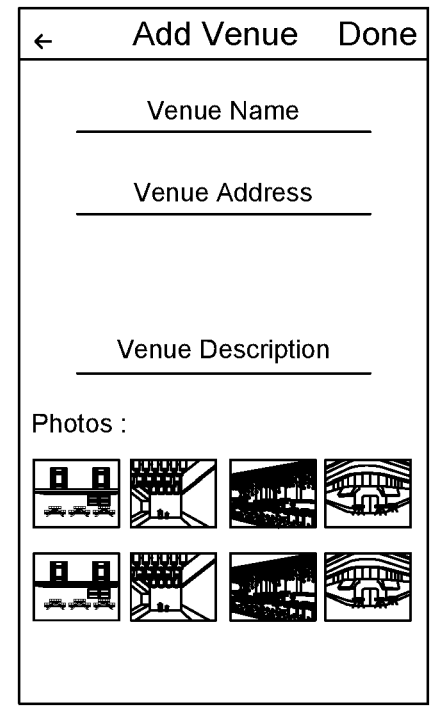

Once the vendor has been authenticated, the vendor is directed to a Home page that provides a list of the vendor's venues entered into the system. The example shown in FIG. 9d shows the vendor has entered details regarding their venue named "Beano's Cafú". With reference to FIG. 9e, the vendor is also able to access and navigate various tabs including "Add Venue", "Promote", "Settings" and "Reviews" whilst in the Home page and the "Your Venues" section of the system application.

Upon gaining access to the system application, the vendor is able to select "settings" (725) in order to set a new password by changing the password, confirming the updated password and checking if the updated and confirmed password match (727), change the venue details (729) or change any settings relating to notifications (731). The vendor is also able to add details of additional venues into the system application using the "Add Venue" page (refer to FIGS. 9f to 9i) by entering the venue name, address, a venue category (for example, whether the venue is a "Club", "Gym", "Restaurant") and a description of the venue, for example, the types of products and/or services that are offered for sale. The vendor is also able to add photographs of their venue (refer to FIGS. 9h and 9i).

Referring once again to FIG. 7, the vendor is also able to access "Reviews & Engagement Analytics" (733) section of the system application which display various analytics including customer reviews and a measure of customer engagement (735), and also enables a vendor to promote notifications or "offers" (737). Promotion of offers includes the ability to create an offer (737), specify the duration of an offer (739), transmit the offer within a particular geographic range (741) and change the demographics of the customers who will receive an offer (743). A vendor is able to access the "Review & Engagement Analytics" (733) section of the system by accessing and navigating the "Your Venues" page in the user interface (refer to FIG. 9d). Whilst in this section of the system application, as described above, the vendor is able generate and define to promote/make offers to consumers (refer to FIG. 9j) by entering an offer title (i.e., the name of the product or service on offer), the sale price associated with the promotion or sales offer, a description of the product or service offered for sale. The vendor is also able to specify the time period within which the promotional offer is available to consumers and upload photographs of, for example, the product that is offered for sale as part of the particular ppromotional offer. By monitoring, collecting and storing information with respect to consumers and feedback received from consumers, the system application is able to learn, with machine learning logic, the nature of, and types of customers, who use the system application and also the types of customers that are more likely to engage with the application. It will be appreciated that this information is valuable since it enables vendors to transmit more relevant promotional offers, advertising and purchasing incentives to consumers and hence, tends to result in increased sales.

Figures 9I, 9J, 9K, 9L:
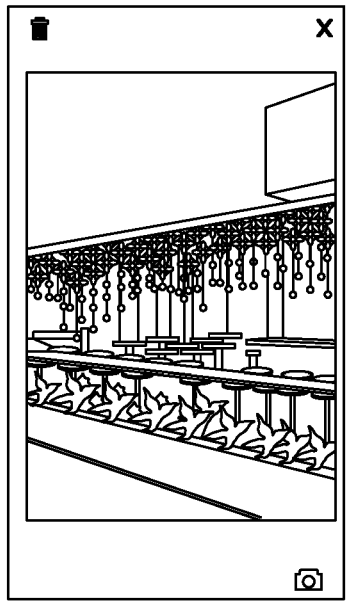

Referring to again to FIG. 7, a vendor is also able to inspect customer reviews of their venue/offers/services/products. For example, the FIG. 9k shows two reviews made by customers "Alex Jack" and "Wilson Alex".

Whilst in the "Your Venues" section of the system application, the vendor is also able to specify the geographic range (distance from venue) within which consumers who are registered to the system application and who meet various criteria will receive various notifications associated with promotional sales created and offered by the vendor. The vendor is also able to specify various demographics of the users that are to receive the offer, for example, gender, age, and behavior based on, for example, previous online searching and/or shopping history.

For example, the owner (vendor) of "Beano's Café" may prefer to specifically target an offer for males and females, between the ages of 20 to 45 that regularly drink coffee and frequent cafes. In this example, the vendor would enter the following demographics/specifications as part of any promotional deal in which a free muffin is offered with any coffee purchase:

Gender: Female and Male
Age: 20-45 years
Behaviour: regularly frequent cafes, coffee drinkers, regularly conduct online searches for café locations.
Offer range: within 5 km of Beano's Cafe.

Referring still to FIG. 7, the vendor is also able to update their details, change their password and update their venue details whilst in the "Your Venue" section of the system application (refer to FIG. 9l).

Figure 8A:
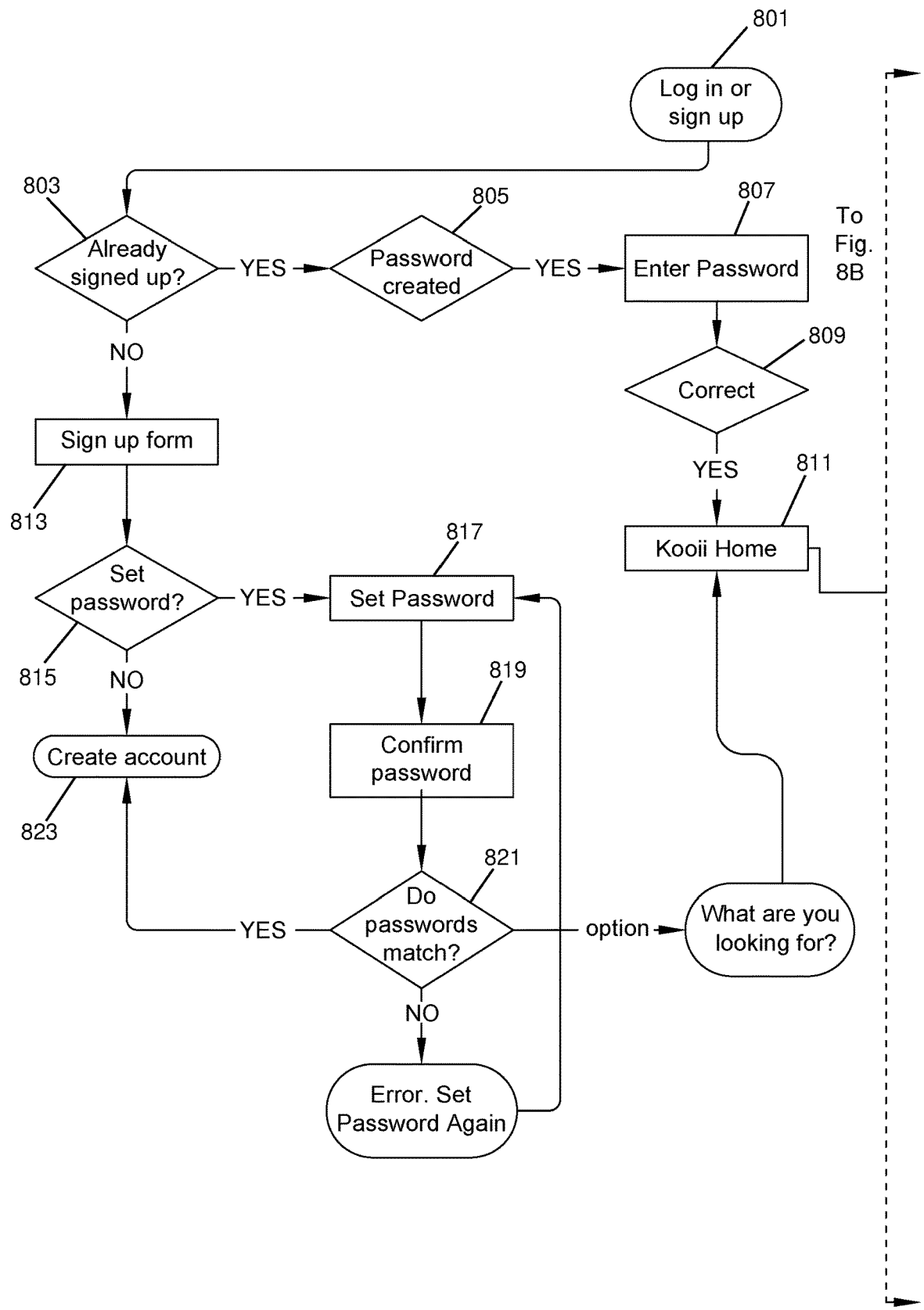
FIG. 8 provides an overview of how the system application, according to an embodiment of the invention, is navigated from a customer's perspective.
Figure 8B:
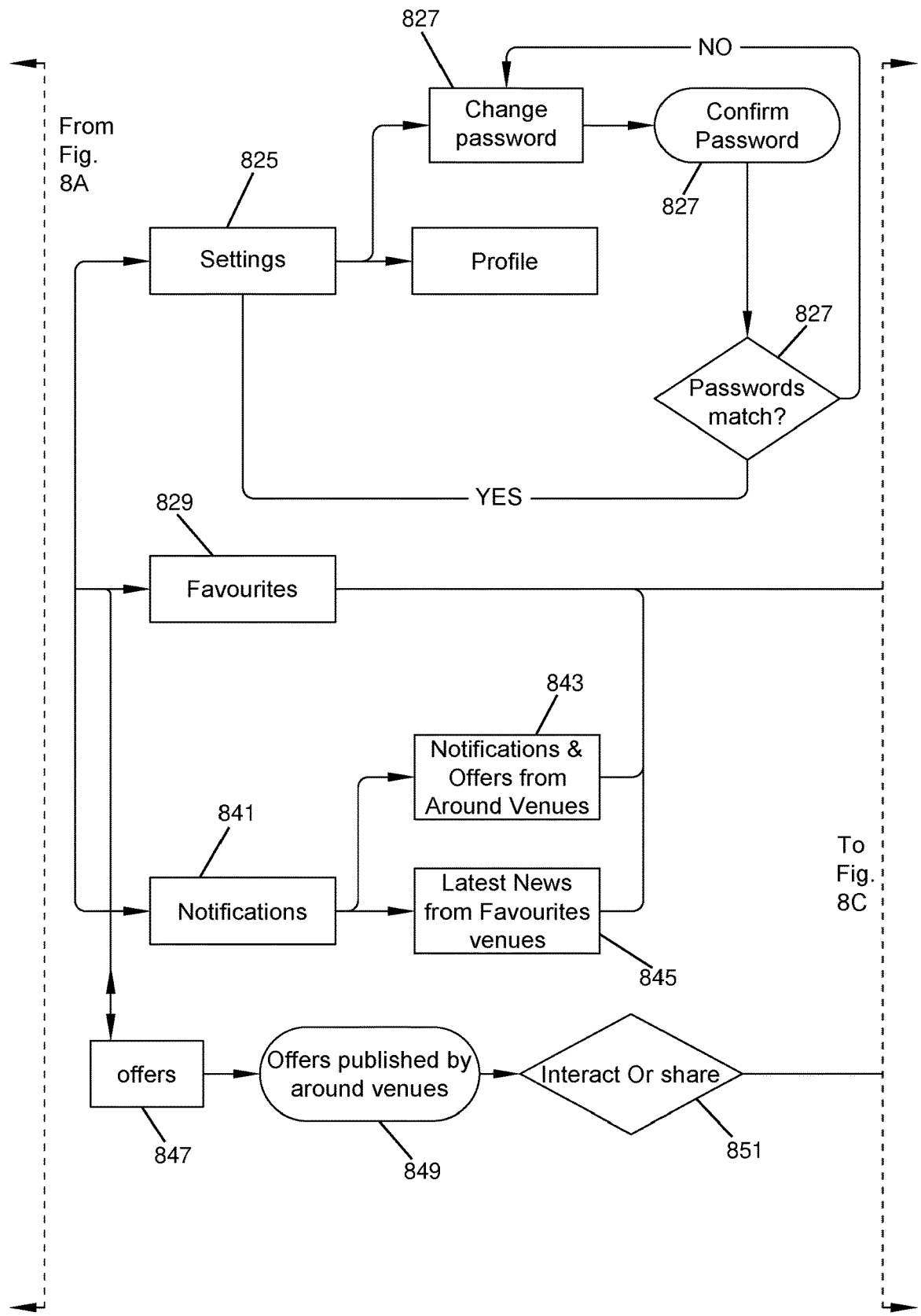
Figure 8C:
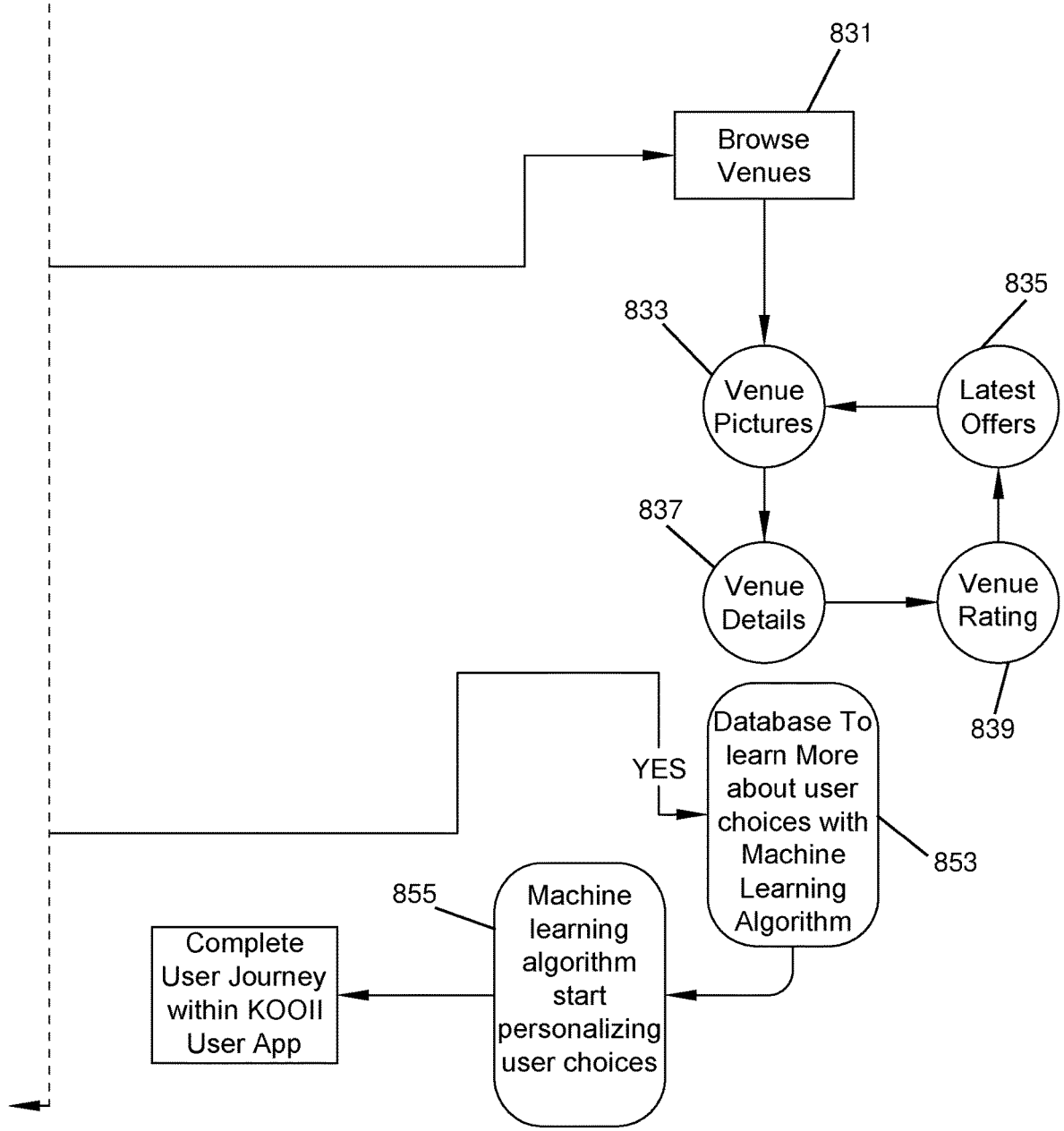
Figure 10A:
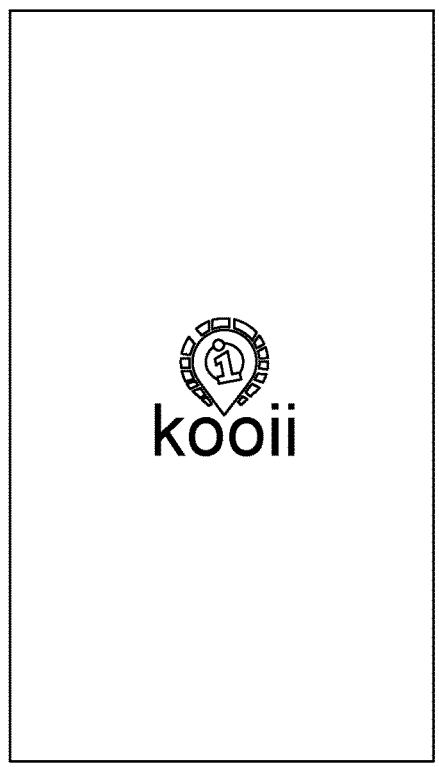
FIGS. 10a to 10q provide examples of the various user interfaces that enable a customer to access and navigate the system application according to an embodiment of the invention.
Figure 10B:
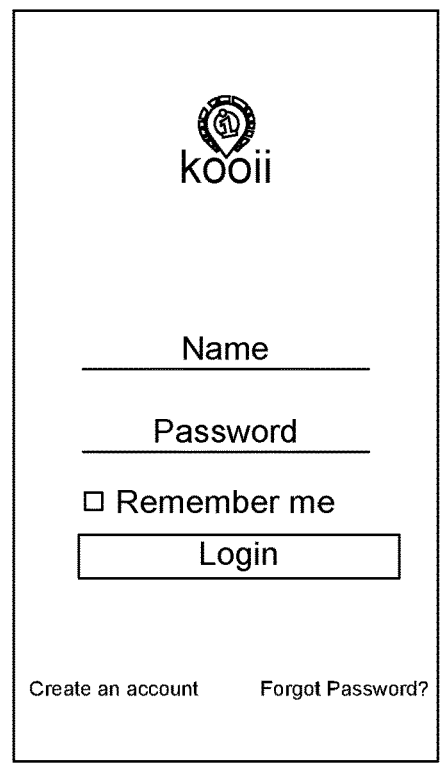
Figure 10C:
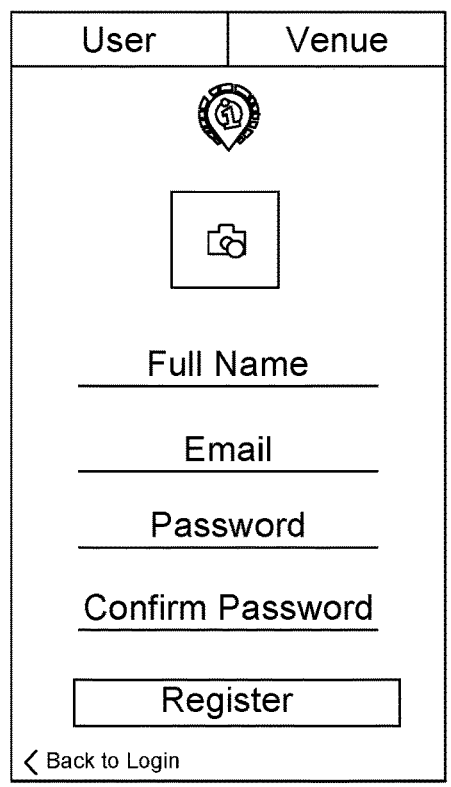
Figure 10D:
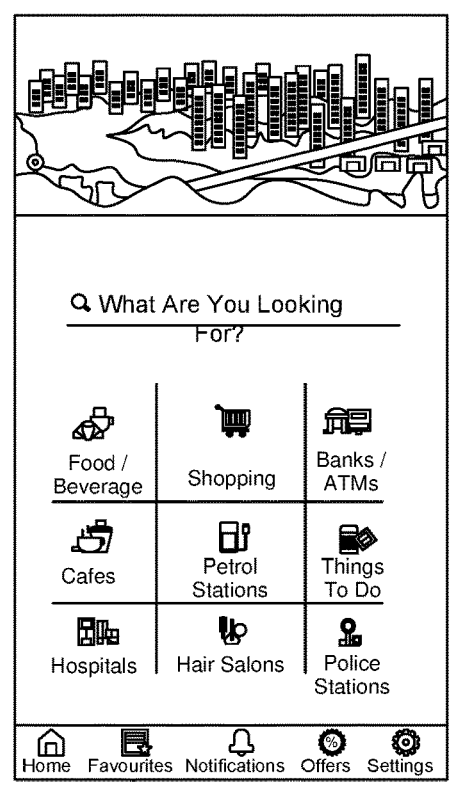
Figure 10E:
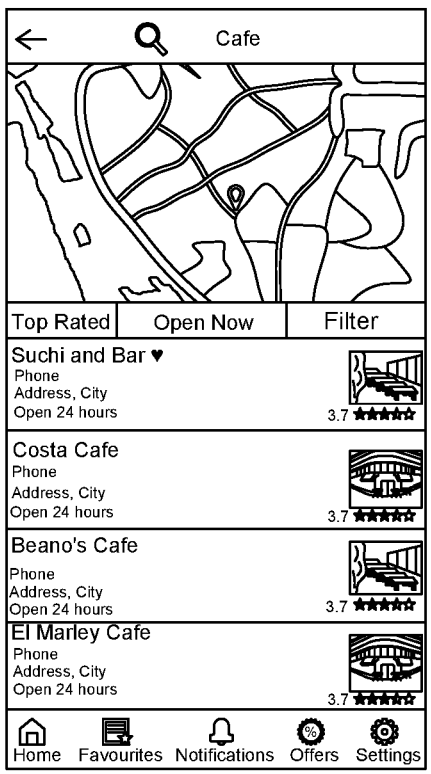
Figure 10F:
Figure 10G:
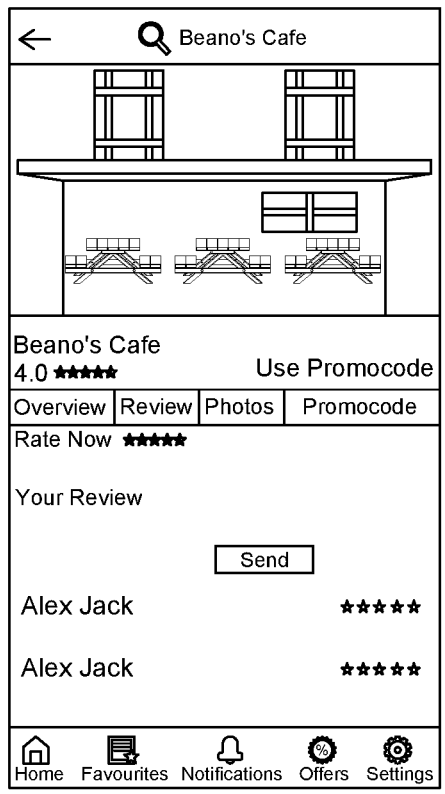
Figure 10H:
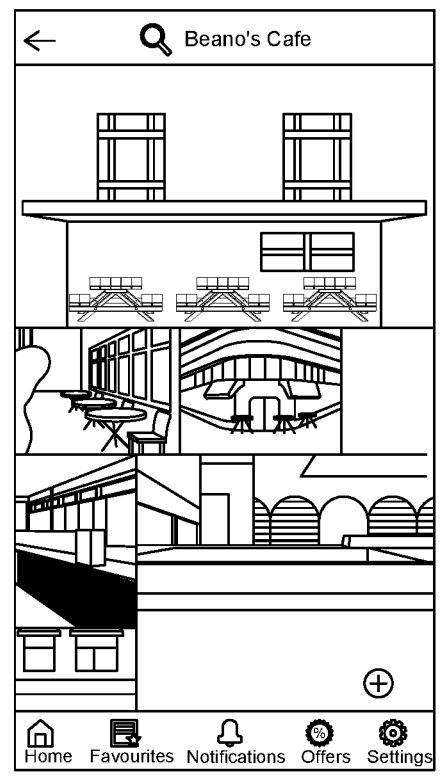
Figure 10I:
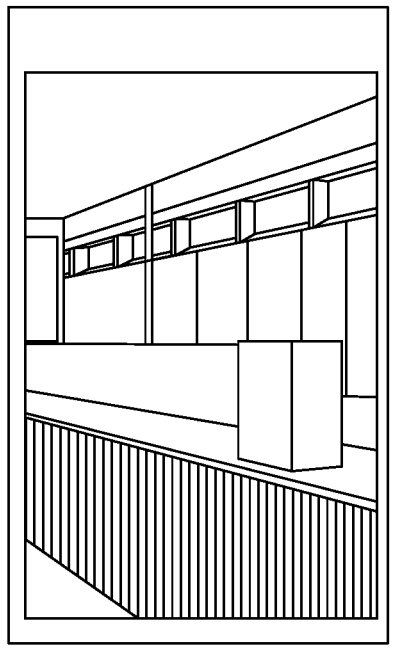
Figure 10J:
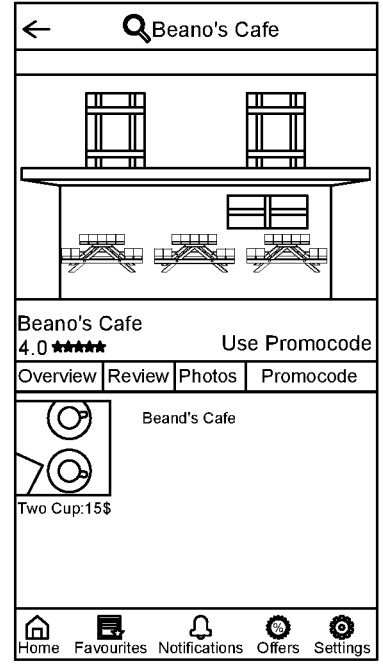
Figure 10K:
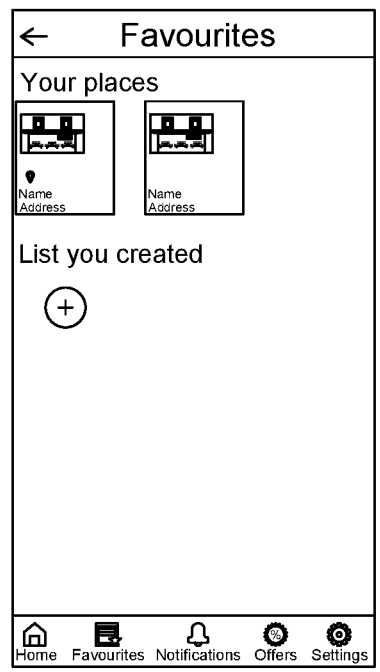
Figure 10L:
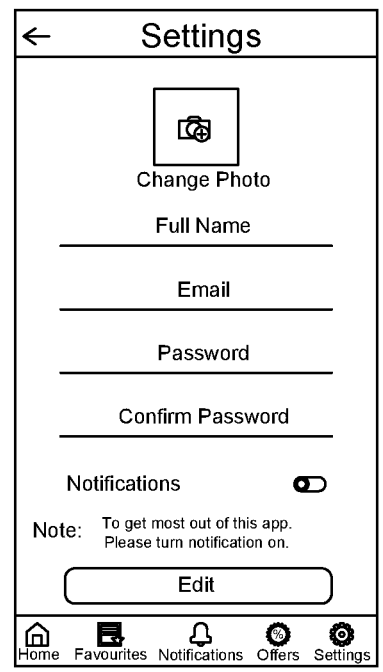
Figure 10M:
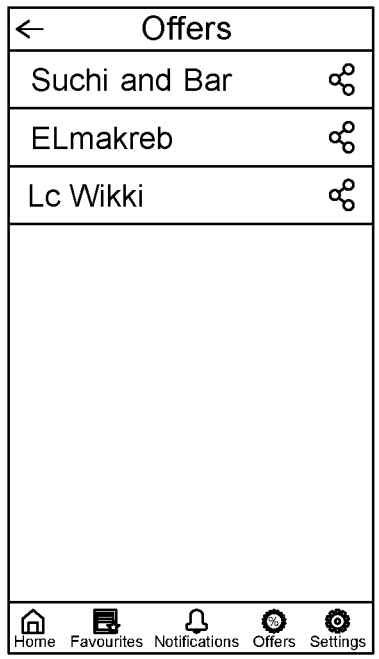
Figure 10N:
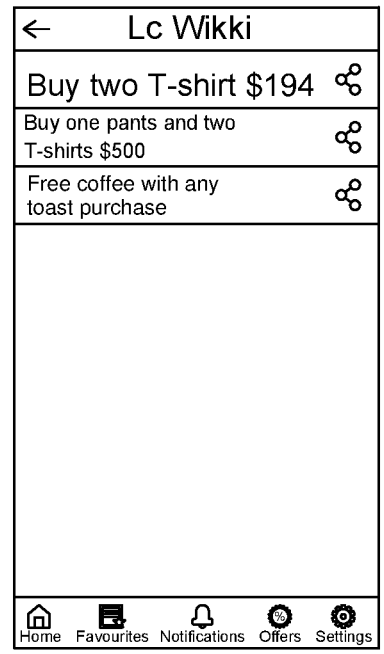
Figure 10O:
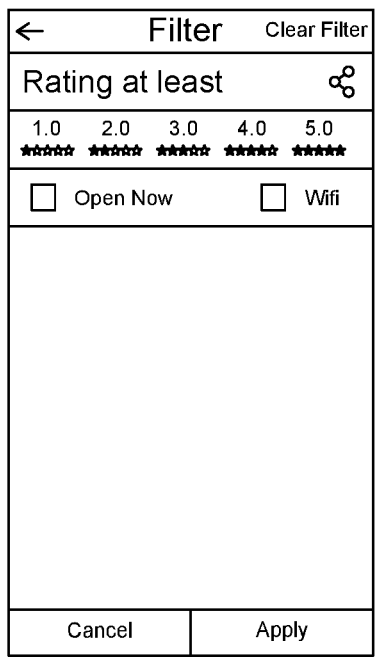
Figure 10P:
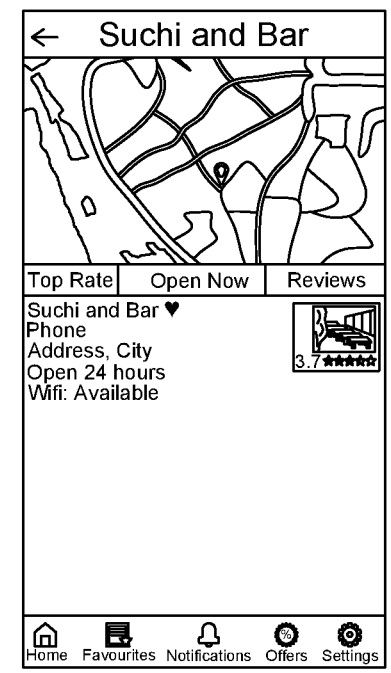

FIG. 8 provides an overview of the system application and the steps a user (customer) takes in registering/login into the system application and navigating various features that are available to the customer whilst accessing various user interfaces, examples of which are depicted in FIGS. 10a to 10p.

As shown in FIG. 8, to access the system application, a customer has to either log-in (801) (if already registered) or sign-up (801) (if a first-time user). If the customer is already registered (803) and has already created a password (805), the customer enters their name and password (807) (refer to FIG. 10b) and if correct (809), the customer is able to access the "Kooii" home page (811). In the event the customer is a first-time user of the system application, the customer is directed to a registration page (or "sign up" form) (813) wherein the customer has to set a password (815) by entering a password (817) and confirming the password (819) (refer to FIG. 10c). If the entered and confirmed passwords match (821), the customer is able to create an account (823). As part of the account creation process, the customer is able to enter details including their full name, email address and password (with confirmation), their venue name and venue address (refer to FIG. 10c).

Once the customer has been authenticated, the customer is directed to a "Kooii" home page that enables a customer to manage their password by selecting the Settings tab (825) thereby enabling the customer to set their password (refer to steps 827). The customer is also able to navigate their favourite venues by entering the "Favorites" (829) section of the application (refer to FIG. 10k), review their notifications by entering the "Notifications" (841) section of the system application (refer to FIG. 10q) and review a list of offers by entering the "Offers" (847) section of the system application.

Still referring to FIG. 8, upon gaining access to the system application, the customer is able to browse information regarding any venue of interest (831) by entering keywords in the user face prompt "What are you looking for" (refer to FIG. 10d). Once a list of venues is presented to the customer that match the search criteria (refer to FIG. 10e), the customer is able to select a particular venue of interest and browse the venue including accessing venue photos (833), review latest offers associated with a venue (835), review ratings of a venue entered by other customers (839) and review venue details (837) (for example, venue address details and opening/closing times of the venue of interest). The customer is also able to search for specific venues of interest using the interface shown in FIG. 10d, by selecting a icon in respect of a service/product of interest, including "Food/Beverage", "Shopping", "Banks/ATMs", "Café", "Petrol Stations", "Things To Do", "Hospitals", "Hair Salons" and "Police Stations".

Still referring to FIG. 8, the customer is also able to view notifications and offers received from various venues (843) and the latest news with respect to any venues on the customer's list of favourites (845) within the "Notifications" section of the system application.

The customer is also able to customize the way in which they prefer to interact with the system application. For example, a customer is able to specify the way in which to receive offers within the "Offers" (857) section of the system application, i.e., by being able to set preferences such as the time, or period of time, at or within which, they prefer to receive offers and the distance (radius) from a particular venue within which they prefer to receive offers. Whilst in the "Offers" section of the system application, the customer is also able to view offers transmitted by venues (857), select the level of interaction with venues and other customers (851), and provide authority for the system to monitor and collect data relating to their purchasing habits and online searching history to enable system application to learn about their purchasing behavior and goods and/or services of interest to the customer (853). Upon receiving authorization from the customer to collect data relating to their purchasing habits and online searching history, the system adopts machine learning logic to begin personalizing offers for the customer.

Upon conducting a search for "Cafes" (for example), a customer is presented with a list of Cafes including "Suchi and Bar", "Costa Café", "Beano's Café" and "El Marley Café" (refer to FIG. 10e). Upon selection of "Beano's Café" (refer to FIG. 10f), the customer is able to inspect details of this particular venue including the address, telephone number, the opening hours, the menu and a rating (in this case 4.0 out of a possible 5).

The customer is also able to rate a venue using the interface shown in FIG. 10g and also view photographs of the venue (refer to FIGS. 10h to 10i).

As shown in FIG. 10j, the customer is able to view any current promotions/offers associated with a venue. For example, as can be seen in FIG. 10j, Beano's Café is offering two cups of coffee at $15.

A customer is also able to create a list of "Favourites" using the system application of the present invention (refer to FIG. 10k).

To manage their details and preferences, a customer accesses the "Settings" function shown in FIG. 10l, in which the customer is able to enter details including their full name, email address, password (with confirmation) and update/add their photograph. The customer is also able to specify in this section of the system application whether they would prefer to receive notifications in relation to any particular venue or retail establishment.

The customer is also able to navigate to the "offers" tab in the "Settings" section of the application, which will provide a list of venues with current/pending offers. For example, as can be seen from FIG. 10m, venues named "Sushi and Bar" (restaurant), "EL makreb" (Café) and "Lc Wikiki" (combined Café/fashion outlet) have current/pending promotions on offer. Upon selection of "Lc Wikiki" (refer to FIG. 10n), customer can view three offers: "Buy two T-shirts: $194", "Buy one pants and two shirts: $500", and "Free coffee with any toast purchase".

Referring to FIG. 10*o,* a customer is also able to filter their search criteria by specifying the minimum rating associated with any venue that is to be identified in any search results, whether the search results should only identify venues current open for trading and whether the search results should only identify venues having WiFi available.

Figure 10Q:
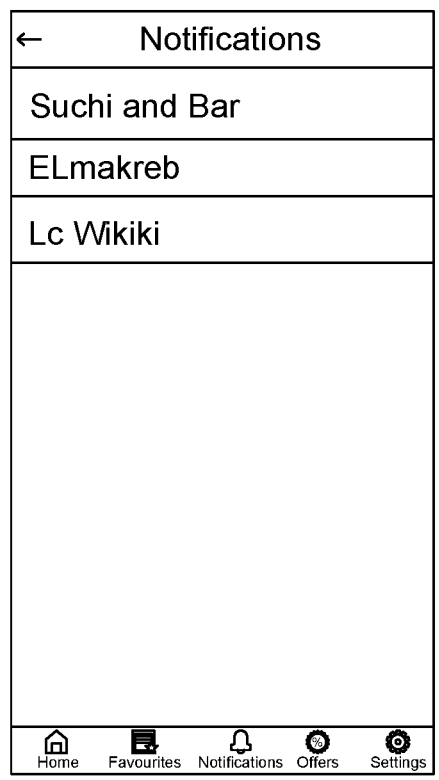

A customer is also able view the location of a venue on a map (refer to FIG. 10*p*) and also view any notifications (current or past) associated with venue. For example, as can be seen in FIG. 10*q*, there are currently three venues with current or past notifications, namely, "Sushi and Bar", ELmakreb" and "Lc Wikiki".

It will be appreciated that the ability for vendors to enter specific details regarding the nature of their products/services, promotional offers, and the type of customers that are to be the target of a particular sales offer or promotion (for example, details regarding the customers who are to receive a particular promotion or sales offer based on customer preferences, search history, purchasing history, location and demographics (gender, occupation, age etc), enables the generation and dissemination of promotional offers that are likely to be highly relevant to the recipients (potential customers) thereby retaining and increasing customer interest and engagement.

Customer interest, engagement and retention is also further increased by use of the system application and method of the present invention by enabling customers to readily access details and promotional offers associated with particular venues of interest ("favourites") or venues having profiles that are consistent with a customer's specifications/preferences (for example, location—i.e., customer's distance from venue, venue rating, venue opening hours) or any preferences based on a customer's previous online search and/or purchasing history.

Customer interest, engagement and retention may also be increased by use of the system application and method of the present invention by enabling users (customers) to apply filters to their search criteria and enter restrictions/preferences regarding the desired frequency and nature of notifications/promotional offers received.

As it will be appreciated by persons skilled in the relevant field of technology that numerous variations and/or modifications may be made to the invention as detailed in the embodiments without departing from the spirit or scope of the invention as broadly described. The present embodiments are therefore to be considered in all aspects as illustrative and not restrictive.

Throughout this specification and the claims which follow, unless the context requires otherwise, the word "comprise", and variations such as "comprises" and "comprising", will be understood to mean the inclusion of a stated feature, integer or step, or group of features, integers or steps, but not the exclusion of any other feature, integer or step, or group of features, integers or steps.

The reference to any prior art in this specification is not, and should not be taken as an acknowledgement, or any suggestion that, the prior art forms part of the common general knowledge.

The claims defining the invention are as follows:

1. A computer implemented system including:
   a primary user device associated with a retailer operable to access and execute computer instruction code that, when executed, establishes communication between the primary user device and one or more secondary user devices associated with a consumer to thereby enable generation and sending of notifications to the one or more secondary user devices;
   a database of previously collected data in respect of users of the secondary user devices; and
   a matching engine configured to match the generated notifications to the user of a secondary user device according to analysis of the previously collected data regarding the user of the secondary user device such that notifications sent to the secondary user device are relevant to the user of the secondary user device; wherein:
   the primary user device is operable to execute computer instruction code to:
      receive a notification when the one or more secondary user devices are located at a particular location, or within a specified region or distance in relation to a geographical location associated with the primary user device, as specified by the one or more secondary user devices, and
      send notifications to the one or more secondary user devices according to one or more specifications entered by the retailer regarding one or more demographics of the one or more consumers to which one or more notifications are preferred to be sent, wherein the one or more notifications are sent:
      only when the one or more secondary user devices are located at the particular location, or within the specified region or distance in relation to the geographical location; and
      only at a particular time, or within a particular period of time, as specified by the one or more secondary user devices:
   such that the communication between the one or more secondary user devices and the primary user device is:
      automatically disabled when the one or more secondary user devices are not located at the particular location, or located outside the specified region or distance in relation to the geographical location, and outside the specified time, or period of time, to thereby prevent sending of notifications to the one or more secondary user devices, and
      automatically enabled when the one or more secondary user devices are located at the particular location, or within the specified region or distance in relation to the geographical location, and at the specified time, or within the specified period of time, to thereby allow sending of notifications to the one or more secondary user devices.

2. A computer implemented system according to claim 1, wherein the notifications relate to retail information.

3. A computer implemented system according to claim 1, wherein the previously collected data includes purchases made by the user of the secondary user device.

4. A computer implemented system according to claim 1, wherein the previously collected data includes search queries initiated by the secondary user device in respect of goods and/or services.

5. A computer implemented system according to claim 1, wherein the previously collected data includes prior purchases made by the secondary user device at one or more geographical locations specified by the primary user device.

6. A computer implemented system according to claim 1, wherein the one or more secondary user devices are further configured to send messages to the primary user device.

7. A computer implemented system according to claim 1, wherein the one or more secondary user devices are further configured to reserve one or more products, or schedule one or more services, offered for sale by a retail establishment associated with the geographical location.

8. A computer implemented system according to claim 1, wherein the one or more secondary user devices are further configured to effect a payment transaction.

9. A computer implemented system according to claim 1, wherein the primary user device automatically sends notifications to one or more secondary user devices upon determining that the one or more secondary user devices are located within the specified region of the geographical location associated with the primary user device.

10. A computer implemented method including:
establishing communication between a primary user device associate with a retailer and one or more secondary user devices associated with a consumer and sending, by the primary user device, operable to access and execute computer instruction code, notifications to the one or more secondary user devices, subsequent to accessing a database of previously collected data in respect of users of the secondary user devices;
wherein the notifications sent to the secondary user devices are matched, by a matching engine, to the user of the secondary user device according to analysis of the previously collected data regarding the user of the secondary user device such that the notifications sent to the secondary user device are relevant to the user of the secondary user device; and further wherein:
the primary user device is operable to execute computer instruction code to:
receive a notification when the one or more secondary user devices are located at a particular location, or within a specified region or distance in relation to a geographical location associated with the primary user device, as specified by the one or more secondary user devices, and
send notifications to the one or more secondary user devices according to one or more specifications entered by the retailer regarding one or more demographics of the one or more consumers to which one or more notifications are preferred to be sent, wherein the one or more notifications are sent:
only when the one or more secondary user devices are located at the particular location, or within the specified region or distance in relation to the geographical location; and
only at a particular time, or within a particular period of time, as specified by the one or more secondary user devices,
such that the communication between the one or more secondary user devices and the primary user device is:
automatically disable when the one or more secondary user devices are not located at the particular location, or located outside the specified region or distance in relation to the geographical location, and outside the specified time, or period of time, to thereby prevent sending of notifications to the one or more secondary user devices, and
automatically enabled when the one or more secondary user devices are located at the particular location, or within the specified region of distance in relation to the geographical location, and at the specified time, or within the specified period of time, to thereby allow sending of notifications to the one or more secondary user devices.

11. A computer implemented method according to claim 10, wherein the notifications relate to retail information.

12. A computer implemented method according to claim 10, wherein the previously collected data includes purchases made by the user of the secondary user device.

13. A computer implemented method according to claim 10, wherein the previously collected data includes search queries initiated by the secondary user device.

14. A computer implemented method according to claim 10, wherein the previously collected data includes prior purchases made by the secondary user device at one or more geographical locations specified by the primary user device.

15. A computer implemented method according to claim 10, wherein the one or more secondary user devices are operable to send messages to the primary user device.

16. A computer implemented method according to claim 10, wherein the one or more secondary user devices are operable to reserve one or more products, or schedule one or more services, offered for sale by a retail establishment associated with the geographical location.

17. A computer implemented method according to claim 10, wherein the one or more secondary user devices are operable to effect a payment transaction.

18. A computer implemented method according to claim 10, wherein the primary user device automatically sends notifications to one or more secondary user devices upon receiving notification that the one or more secondary user devices are located within the specified region of the geographical location associated with the primary user device.

19. A non-transitory computer readable medium including instructions stored therein executable by one or more processors to perform the steps of:
establishing communication between a primary user device associated with the retailer and one or more secondary user devices associated with a consumer and sending, by the primary user device, notifications to the one or more secondary user devices, subsequent to accessing a database of previously collected data in respect of users of the secondary user devices;
wherein the notifications sent to the secondary user device are matched, by a matching engine, to the user of the secondary user device according to analysis of the previously collected data regarding the user of the secondary user device such that the notifications sent to the secondary user device are relevant to the user of the secondary user device; and further wherein:
the primary user device is operable to execute computer instruction code to:
receive a notification when the one or more secondary user devices are located at a particular location, or within a specified region or distance of a geographical location associated with the primary user device, as specified by the one or more secondary user devices; and
send notifications to the one or more secondary user devices according to one or more specifications entered by the retailer regarding one or more demographics of the one or more consumers to which one or more notifications are preferred to be sent, wherein the one or more notifications are sent:
only when the one or more secondary user devices are located at the particular location, or within the specified region or distance in relation to the geographical location; and
only at a particular time, or within a particular period of time, as specified by the one or more secondary user devices,
such that the communication between the one or more secondary user devices and the primary user device is,
automatically disabled when the one or more secondary user devices are not located at the particular location, or located outside the specified region or distance in relation to the geographical location, and outside the specified time or period of time, to thereby prevent sending of notifications to the one or more secondary user devices, and automatically enabled when the one or more secondary user devices are located at the particular location, or within the specified region or distance in relation to the geographical location, and at the specified time, or within the specified period of time, to thereby allow sending of notifications to the one or more secondary user devices.

20. A non-transitory computer readable medium according to claim 19, wherein the notifications relate to retail information.

21. A non-transitory computer readable medium according to claim 19, wherein the previously collected data includes purchases made by the user of the secondary user device.

22. A non-transitory computer readable medium according to claim 19, wherein the previously collected data includes search queries initiated by the secondary user device.

23. A non-transitory computer readable medium according to claim 19, wherein the previously collected data includes prior purchases made by the secondary user at one or more geographical locations specified by the primary user device.

24. A non-transitory computer readable medium according to claim 19, wherein the one or more secondary user devices are operable to send messages to the primary user device.

25. A non-transitory computer readable medium according to claim 19, wherein the one or more secondary user devices are operable to reserve one or more products, or schedule one or more services, offered for sale by a retail establishment associated with the geographical location.

26. A non-transitory computer readable medium according to claim 19, wherein the one or more secondary user devices are operable to effect a payment transaction.

27. A non-transitory computer readable medium according to claim 19, wherein the primary user device automatically sends notifications to one or more secondary user devices upon receiving notification that the one or more secondary user devices are located within the specified region of the geographical location associated with the primary user device.

* * * * *